(12) United States Patent
Kim et al.

(10) Patent No.: US 12,100,226 B2
(45) Date of Patent: *Sep. 24, 2024

(54) ELECTRONIC DEVICE FOR CONTROLLING DRIVING VEHICLE AND OPERATION METHOD OF THE ELECTRONIC DEVICE

(71) Applicant: Samsung Electronics Co., Ltd., Suwon-si (KR)

(72) Inventors: Kyoungyoung Kim, Suwon-si (KR); Sangsoo Ko, Yongin-si (KR); Byeoungsu Kim, Hwaseong-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,168

(22) Filed: Apr. 25, 2023

(65) Prior Publication Data

US 2023/0260290 A1 Aug. 17, 2023

Related U.S. Application Data

(63) Continuation of application No. 17/146,125, filed on Jan. 11, 2021, now Pat. No. 11,670,092.

(30) Foreign Application Priority Data

Apr. 21, 2020 (KR) .......................... 10-2020-0048305

(51) Int. Cl.
*G06V 20/00* (2022.01)
*B60W 60/00* (2020.01)
(Continued)

(52) U.S. Cl.
CPC ........... *G06V 20/584* (2022.01); *B60W 60/00* (2020.02); *G01S 17/931* (2020.01);
(Continued)

(58) Field of Classification Search
CPC ........ G06V 20/584; G06V 20/58; G06T 7/11; G01S 17/931; B60W 60/00; B60W 2420/403; G05D 1/0088
(Continued)

(56) References Cited

U.S. PATENT DOCUMENTS

| 8,108,119 B2 | 1/2012 | Southall et al. |
| 9,542,848 B2 | 1/2017 | Drescher |
| 2015/0043771 A1* | 2/2015 | Wu .......................... G06T 7/20 382/103 |
| 2018/0129888 A1* | 5/2018 | Schubert ................ G06V 40/25 |

(Continued)

FOREIGN PATENT DOCUMENTS

| KR | 1020150136225 A | 12/2015 |
| KR | 101720679 B1 | 3/2017 |

(Continued)

OTHER PUBLICATIONS

Sun, L. et al., "A Fast Integrated Planning and Control Framework for Autonomous Driving via Imitation Learning," arXiv:1707.02515v1 [cs.AI] Jul. 9, 2017.
(Continued)

*Primary Examiner* — Mahmoud S Ismail
(74) *Attorney, Agent, or Firm* — Muir Patent Law, PLLC

(57) ABSTRACT

An electronic device configured to control a host vehicle includes: an image sensor configured to photograph a surrounding environment of the host vehicle; and a processor configured to perform an image processing operation based on a first image captured by the image sensor, and control the host vehicle based on the processing result, wherein the processor determines whether to use a high speed performance of the image processing operation based on a speed of the host vehicle, and the electronic device is configured such that when the high speed performance is not used, the processor performs the image processing operation by using a first image processing module, and when the high speed performance is used, the processor performs the image
(Continued)

processing operation by using a second image processing module having less data throughput than the first image processing module.

20 Claims, 21 Drawing Sheets

(51) Int. Cl.
*G01S 17/931* (2020.01)
*G05D 1/00* (2006.01)
*G06T 7/11* (2017.01)
*G06V 20/58* (2022.01)

(52) U.S. Cl.
CPC .............. *G05D 1/0088* (2013.01); *G06T 7/11* (2017.01); *G06V 20/58* (2022.01); *B60W 2420/403* (2013.01)

(58) Field of Classification Search
USPC ............................................................ 701/96
See application file for complete search history.

(56) References Cited

U.S. PATENT DOCUMENTS

| 2019/0266418 | A1 | 8/2019 | Xu et al. | |
| 2020/0059613 | A1* | 2/2020 | Dreier | H04N 25/46 |
| 2021/0201442 | A1* | 7/2021 | Eric | G09G 5/38 |
| 2021/0400241 | A1* | 12/2021 | Yamanaka | H04N 23/90 |
| 2022/0222936 | A1* | 7/2022 | Hamano | G06T 7/246 |
| 2022/0227285 | A1* | 7/2022 | Arai | G08G 1/166 |

FOREIGN PATENT DOCUMENTS

| KR | 101890612 B1 | 8/2018 |
| KR | 1020180120122 A | 11/2018 |
| KR | 1020190026773 A | 3/2019 |

OTHER PUBLICATIONS

Kohli, P. et al., "Enabling Pedestrian Safety Using Computer Vision Techniques: A Case Study of the 2018 Uber Inc. Self-Driving Car Crash," arXiv:1805.11815v1 [cs.CV] May 30, 2018, pp. 1-10.

* cited by examiner

ELECTRONIC DEVICE FOR CONTROLLING DRIVING VEHICLE AND OPERATION METHOD OF THE ELECTRONIC DEVICE

CROSS-REFERENCE TO RELATED APPLICATION

This application is a continuation application of U.S. patent application Ser. No. 17/146,125, filed Jan. 11, 2021, which claims the benefit of Korean Patent Application No. 10-2020-0048305, filed on Apr. 21, 2020, in the Korean Intellectual Property Office, the disclosure of which is incorporated herein in its entirety by reference.

BACKGROUND

The disclosed embodiments relate to an electronic device controlling a host vehicle and an operating method of the electronic device, and more particularly, to an electronic device which determines whether high speed performance of an image processing operation is necessary based on information about a host vehicle, and when the high speed performance is required, executes an image processing operation by using an image processing module having a small amount of data throughput. An operating method of the electronic device is also disclosed.

An autonomous driving system (or an advanced driver assistance system (ADAS)) may perform safe driving by obtaining information about a host vehicle and a surrounding environment from various types of sensors, and controlling the host vehicle based on the obtained information. On the other hand, the autonomous driving system needs to process a considerable amount of data to control the host vehicle, and a fast data processing speed of the autonomous driving system is typically required from a standpoint that the host vehicle may drive at a high speed. In particular, when the host vehicle is moving at a low speed, the importance of a reaction speed of the autonomous driving system is relatively low, but in the case of a dangerous situation such as when the host vehicle is moving at a high speed or when a nearby vehicle suddenly cuts in, a fast response speed of the autonomous driving system is required.

SUMMARY

The disclosed embodiments provide an electronic device which determines whether high speed performance of an image processing operation is required, and performs an image processing operation by using an image processing module corresponding to the determination result, and an operation method of the electronic device.

According to an aspect of the inventive concept, an electronic device configured to control a host vehicle includes: an image sensor configured to photograph a surrounding environment of the host vehicle; and a processor configured to perform an image processing operation based on a first image captured by the image sensor, and control the host vehicle based on the processing result, wherein the processor determines whether to use a high speed performance of the image processing operation based on a speed of the host vehicle, and the electronic device is configured such that when the high speed performance is not used, the processor performs the image processing operation by using a first image processing module, and when the high speed performance is used, the processor performs the image processing operation by using a second image processing module having less data throughput than the first image processing module.

According to another aspect of the inventive concept, an electronic device configured to control a host vehicle includes: an image sensor configured to photograph a surrounding environment of the host vehicle; and a processor configured to perform an image processing operation based on a first image photographed by the image sensor, and control the host vehicle based on the processing result, wherein the processor is configured to select an operation parameter of an image processing operation based on driving information about the host vehicle or information about the surrounding environment of the host vehicle, and perform the image processing operation according to the selected operation parameter.

According to another aspect of the inventive concept, an operating method of an electronic device configured to control a host vehicle includes: obtaining a first image of a surrounding environment of the host vehicle; obtaining speed information about the host vehicle; identifying whether a speed of the host vehicle is greater than or equal to a threshold speed; when the speed of the host vehicle is less than the threshold speed, processing the first image by using a first image processing method; when the speed of the host vehicle is greater than or equal to the threshold speed, processing the first image by using a second image processing module having less data throughput than the first image processing method; and controlling the host vehicle based on the processing result of the first image.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
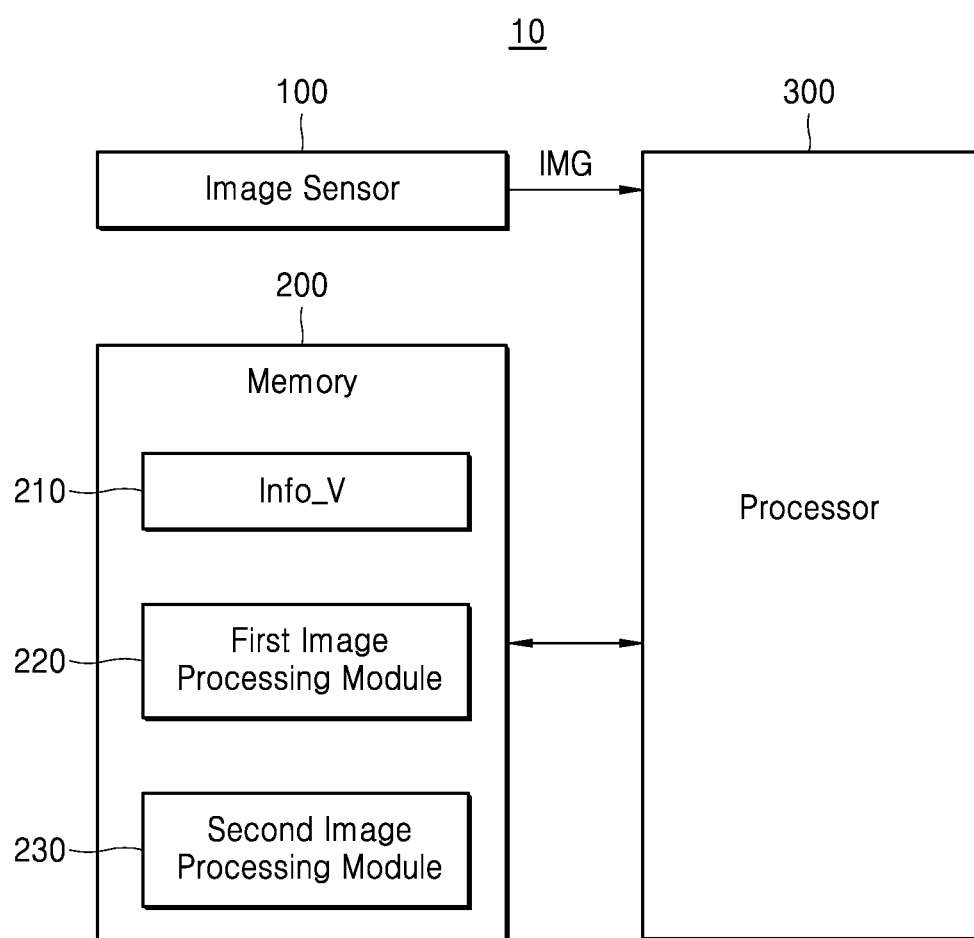
FIG. 1 is a block diagram of an electronic device according to an example embodiment of the inventive concept.

FIG. 1 is a block diagram of an electronic device 10 according to an example embodiment of the inventive concept.

Referring to FIG. 1, the electronic device 10 may include an image sensor 100, a memory 200, and a processor 300.

The electronic device 10 may include a device performing an image processing operation on an image. In this case, the image processing operation may, by analyzing the image, be referred to as an operation of performing object detection or object segmentation on at least one object in the image. The type of the image processing operation is not limited to the above-described examples, and may include various operations.

The electronic device 10 may be implemented as or may be comprised of, for example, a personal computer (PC), an Internet of Things (IoT) device, or a portable electronic device. The portable electronic device may be provided in various devices such as a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, and a wearable device. Various of these devices may be combined and in communication in order to implement the electronic device 10.

In an embodiment, the electronic device 10 may include hardware, software, and/or firmware, and may be implemented as a device which controls the host vehicle (for example, a vehicle device such as an advanced driver assistance system (ADAS)). The electronic device 10 may perform an image processing operation based on a captured image of a surrounding environment of the host vehicle, and control the host vehicle based on the processing result (for example, the object recognition or the segmentation result). Hereinafter, for convenience of description, it is assumed that the electronic device 10 is a device controlling the host vehicle.

The image sensor 100 may be embedded in the electronic device 10, receive an image signal related to the surrounding environment of the electronic device 10, and output the received image signal as an image. For example, the image sensor 100 may generate an image by converting light of an external environment in front or in various directions into electrical energy, and output the generated image to the processor 300. In an embodiment, when the electronic device 10 is a device controlling the host vehicle, the image sensor 100 may receive a video signal related to the surrounding environment of the host vehicle and output the received video signal as an image.

The memory 200 may include a storage location for storing data and may store data generated by using the image sensor 100 and various data generated in the process of performing the operation of the processor 300. For example, the memory 200 may store an image obtained by using the image sensor 100. In addition, as described later in connection with the operation of the processor 300, the memory 200 may store the processing result according to the image processing operation of the processor 300.

The memory 200 according to an example embodiment of the inventive concept may include information about the host vehicle Info_V. The information about the host vehicle Info_V may include driving information about the host vehicle or surrounding environment information about the host vehicle. The driving information and surrounding environment information may be real-time active information about the vehicle or its surroundings. In this case, the driving information about the host vehicle Info_V may include at least one of speed, acceleration, a moving distance, and a location of the host vehicle. For example, the driving information about the host vehicle may be obtained by using a speedometer (not illustrated) for detecting the speed of the host vehicle or an accelerometer (not illustrated) for detecting the acceleration of the host vehicle. In another example, the driving information about the host vehicle may be obtained by calculating the driving information about the host vehicle based on a result of processing of an image processing operation that has already been performed, for example, a moving distance between frames of a fixed object included in a previous image. In another example, the driving information about the host vehicle may be obtained based on global positioning system (GPS) information about the host vehicle received through communication with the outside. However, the type and acquisition method of the driving information about the host vehicle of the inventive concept are not limited to the above-described examples.

Here, the surrounding environment information about the host vehicle may include at least one of speed, acceleration, a moving distance and a location of an object located around the host vehicle, and a normal speed or a speed limit of a road on which the host vehicle travels. For example, the surrounding environment information about the host vehicle may be calculated based on the processing result of the image processing operation that has already been performed. In another example, the surrounding environment information about the host vehicle may be received through communication with the outside (e.g., electronic communication). However, the type and acquisition method of the surrounding environment of the host vehicle of the inventive concept are not limited to the above-described examples.

In addition, the memory 200 may store a first image processing module 220 and a second image processing module 230. The first image processing module 220 and the second image processing module 230 may perform an image processing operation based on the image captured by the image sensor 100. In an embodiment, the second image processing module 230 may be designed to have less data throughput than the first image processing module 220. The second image processing module 230 may process the image according to the same image processing operations as the first image processing module 220, but may be designed in a manner that an amount of input data in each image processing operation is reduced. Accordingly, the second image processing module 230 may perform the image processing operation at a faster speed than the first image processing module 220. Thus, the first image processing module 220 may perform a first image processing method, and the second image processing module 230 may perform a second image processing method.

The first image processing module 220 and the second image processing module 230 may be implemented with firmware or software, and may be loaded into the memory 200 and executed by the processor 300. However, the embodiments are not limited thereto, and the first image processing module 220 and the second image processing module 230 may be implemented with hardware or a combination of software and hardware. The first image processing module 220 and the second image processing module 230 may be implemented with computer program code stored on a computer readable medium, and may be implemented as two separate sets of instructions, or as a single combined set of instructions. Detailed descriptions of the image processing operations of the first image processing module 220 and the second image processing module 230 are given later with reference to FIG. 8.

The processor 300 may control all operations of the electronic device 10. The processor 300 may include various arithmetic processing devices such as a central processing unit (CPU), a graphics processing unit (GPU), an application processor (AP), a digital signal processor (DSP), a field-programmable gate array (FPGA), a neural network processing unit (NPU), and an electronic control unit (ECU), and an image signal processor (ISP).

The processor 300 may perform the image processing operation based on the image captured by the image sensor 100 and control the host vehicle based on the processing result. In an embodiment, the processor 300 may receive an image from the image sensor 100, and by analyzing the received image by using the first image processing module 220 or the second image processing module 230 stored in the memory 200, may perform the object detection or object segmentation. In addition, the processor 300 may control the host vehicle based on the object detection or segmentation result.

The processor 300 according to an example embodiment of the inventive concept may determine whether high speed performance of the image processing operation is required based on the information about the host vehicle Info_V, and according to the determination result, may select one of the first image processing module 220 and the second image processing module 230, and perform the image processing operation by using the selected image processing module. In this case, the case when the high speed performance is required may mean the cases when the host vehicle is moving at a high speed, the nearby vehicle is very close to the host vehicle, or the speed of the nearby vehicle is rapidly decreasing, and thus a fast response speed of the host vehicle is required or desirable for safety.

When it is determined that the high speed performance is not required, the processor 300 may select the first image processing module 220. On the other hand, when it is determined that the high speed performance is required, the processor 300 may select the second image processing module 230 having less data throughput than the first image processing module 220. When the processor 300 performs the image processing operation by using the second image processing module 230, the processor 300 may obtain the processing result faster than the case of performing the image processing operation by using the first image processing module 220.

The processor 300 according to an embodiment of the inventive concept may determine whether the high speed performance of the image processing operation is required, or should be used, according to various methods based on the information about the host vehicle Info_V. For example, the processor 300 may determine whether the high speed performance of the image processing operation is required or should be used based on the speed of the host vehicle among the information about the host vehicle Info_V. As another example, the processor 300 may determine whether a preset event has occurred based on the surrounding environment information and the information about the host vehicle Info_V, and may determine the need to perform the high speed image processing operation according to whether the preset event has occurred. Detailed description of the operation for determining the need for the high speed performance of the image processing operation of the processor 300 is provided later with reference to FIGS. 4 through 7.

In the above-described example, it is described that when the processor 300 receives an image IMG from the image sensor 100, the processor 300 determines the need for the high speed performance of the image processing operation, selects the first image processing module 220 or the second image processing module 230 according to the determination result, and performs the image processing operation by using the selected image processing module. However, the embodiment is not limited thereto. The processor 300 may determine a need for the high speed performance of the image processing operation on a periodic basis. For example, the processor 300 may be implemented in a manner of determining a need for the high speed performance whenever the image processing operation is completed for a preset number of images.

The electronic device 10 according to the technical idea of the inventive concept may determine whether the high speed performance of the image processing operation is required or is desirable, and when the high speed performance is required or desirable, may control the host vehicle at a fast speed by performing the image processing operation by using an image processing module having less amount of data throughput.

In FIG. 1, although the electronic device 10 is illustrated and described as including the image sensor 100, according to an embodiment, the electronic device 10 and the image sensor 100 may be separate components. The electronic device 10 may also be implemented by a method of receiving an image from the image sensor 100 that is external and performing the image processing operation on the received image. In addition, according to certain embodiments, the electronic device 10 may not include the image sensor 100, and may receive an image via a communication device (not illustrated), and may be implemented in a manner for performing the image processing operation on the received image.

In addition, in FIG. 1, although the electronic device 10 is illustrated and described as including one image sensor 100, the electronic device 10 may include a plurality of image sensors 100. The electronic device 10 may perform the image processing operation on a plurality of images received from the plurality of image sensors 100, and control the host vehicle based on the processing result.

In addition, in FIG. 1, although the electronic device 10 is illustrated and described as including the memory 200, according to an embodiment, the electronic device 10 and the memory 200 may be separate components, and the electronic device 10 may also be implemented in a manner of loading the first image processing module 220 or the second image processing module 230 stored in the memory 200, which is external.

In addition, in FIG. 1, although the electronic device 10 is illustrated and described as including one memory 200, the electronic device 10 may include a plurality of memories 200. In addition, according to an embodiment, the electronic device 10 may be implemented as storing the image captured by the image sensor 100 in one memory, and storing the first image processing module 220 or the second image processing module 230 in the remaining memories.

Figure 2:
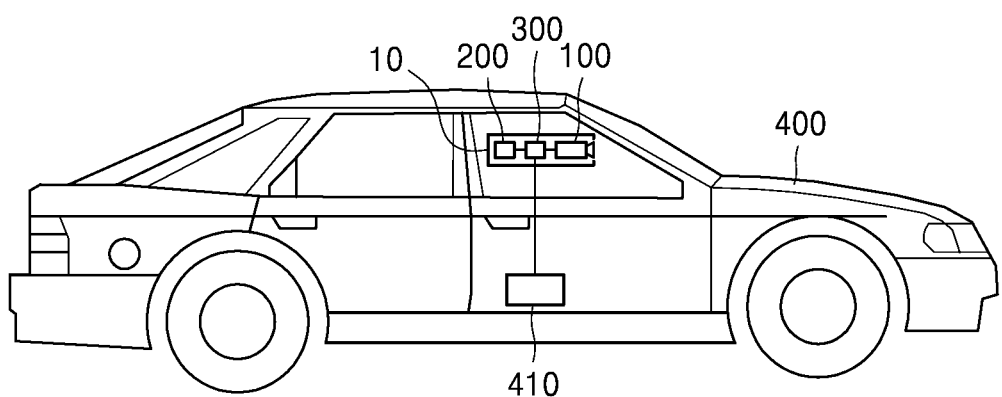
FIG. 2 is a diagram of a host vehicle including an electronic device, according to an example embodiment of the inventive concept.

FIG. 2 is a diagram of a host vehicle including an electronic device 10, according to an example embodiment of the inventive concept. FIG. 2 is a diagram illustrating an example of a host vehicle 400 including the electronic device 10 of FIG. 1.

Referring to FIGS. 1 and 2, the host vehicle 400 may include the electronic device 10 and a vehicle controller 410. At least part of the electronic device 10 may be arranged on the top of the host vehicle 400, and the image sensor 100 may photograph the front of the host vehicle 400. However, an arrangement position of the electronic device 10 is not limited to this embodiment, and the electronic device 10 may be arranged at one or more various positions in the host vehicle 400 according to an embodiment. For example, different parts of the electronic device 10 may be at different positions within the vehicle 400. In one embodiment, the electronic device 10 may be implemented in a manner of performing only the image processing operation on an image captured by the image sensor 100, and providing a result of the image processing operation to the vehicle controller 410.

The vehicle controller 410 may control the overall driving of the host vehicle 400. The vehicle controller 410 may determine a surrounding situation of the host vehicle 400, and control a driving direction or a driving speed of the host vehicle 400 based on the determination result. In an embodiment, the vehicle controller 410 may receive the result of the image processing operation (for example, object recognition result and analysis result) of the electronic device 10, determine the surrounding situation of the host vehicle 400 based on the received processing result, and control the driving direction, the driving speed, or the like of the host vehicle 400, by transmitting a control signal to a driving unit (not illustrated) of the host vehicle 400 based on the determination result. The vehicle controller 410 may be implemented with hardware, software, and firmware, and may include, for example, a computer including a processor that performs the controlling of the host vehicle 400.

In FIG. 2, the vehicle controller 410 and the electronic device 10 are illustrated and described as separate components. However, according to an embodiment, the electronic device 10 may be implemented in a manner of including the vehicle controller 410 or including a processor 300 of the electronic device 10 and the vehicle controller 410 in a single configuration.

Figure 3:
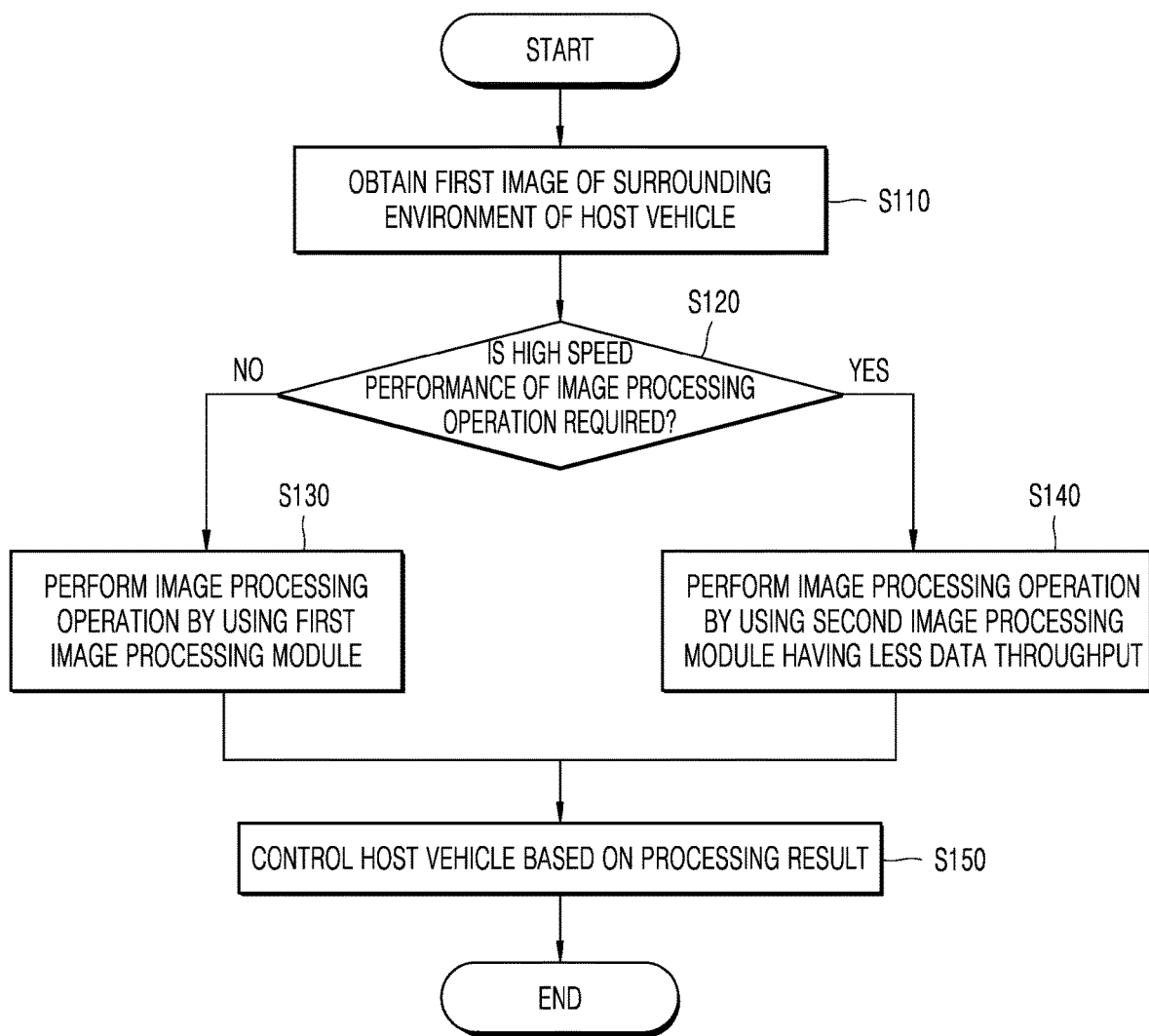
FIG. 3 is a flowchart of an operating method of an electronic device, according to an example embodiment of the inventive concept.

FIG. 3 is a flowchart of an operating method of the electronic device 10, according to an example embodiment of the inventive concept. FIG. 3 is a flowchart of an operating method of the electronic device 10 of FIG. 1. At least some of operations in FIG. 3 may be performed by the processor 300 of the electronic device 10.

Referring to FIGS. 1 and 3, the electronic device 10 may obtain a first image of the surrounding environment of the host vehicle (S110). For example, the electronic device 10 may obtain the first image of the surrounding environment of the host vehicle via the image sensor 100. As another example, when the electronic device 10 is implemented as not including the image sensor 100, the electronic device 10 may also be implemented in a manner of obtaining the first image from the outside.

Then, the electronic device 10 may determine whether the high speed performance of the image processing operation is required (S120). The electronic device 10 may determine whether the high speed performance of the image processing operation is required based on driving information about the host vehicle or surrounding environment information about the host vehicle. The case when the high speed performance is required may mean the case when the host vehicle moves at a high speed, a nearby vehicle is very close to the host vehicle, or the speed of the nearby vehicle is rapidly decreasing, and thus a fast response speed of the host vehicle is required for safety. For example, the electronic device 10 may reference a stored set of parameters that correspond to situations where high speed performance is required (e.g., where it would be particularly useful or desirable to control the vehicle to avoid damage or an accident). The driving information about the host vehicle or the surrounding environment information about the host vehicle may be substantially the same as descriptions given above with respect to FIG. 1, and thus redundant descriptions thereof are omitted.

When the high speed performance of the image processing operation is not required (S120—N), the electronic device 10 may perform the image processing operation by using the first image processing module 220 (S130). For example, when the speed of the host vehicle is less than a first threshold speed, the processor 300 may select the first image processing module 220 among the first image processing module 220 and the second image processing module 230, and perform the image processing operation by using the selected first image processing module 220.

In this case, the first image processing module 220 may include an image processing module designed to have more data throughput than the second image processing module 230. In this case, the image processing operation may, by analyzing the image, be referred to as an operation of performing object detection or object segmentation of at least one object in the image. A type of the image processing operation is not limited to the above-described examples, and may include various operations.

On the other hand, when the high speed performance of the image processing operation is required (S120—Y), or would be particularly useful or desirable, the electronic device 10 may perform the image processing operation by using the second image processing module 230 having less data throughput than the first image processing module 220 (S140). When the image processing operation is performed by using the second image processing module 230, the electronic device 10 may obtain the processing result faster than the case of performing the image processing operation by using the first image processing module 220. Then, the electronic device 10 may control the host vehicle based on the processing result (S150). The electronic device 10 may determine the surrounding situation of the host vehicle based on the object recognition result or object segmentation result, which is the result of performing the image processing operation, and may control the driving direction or the driving speed based on the determination result.

Figure 4:
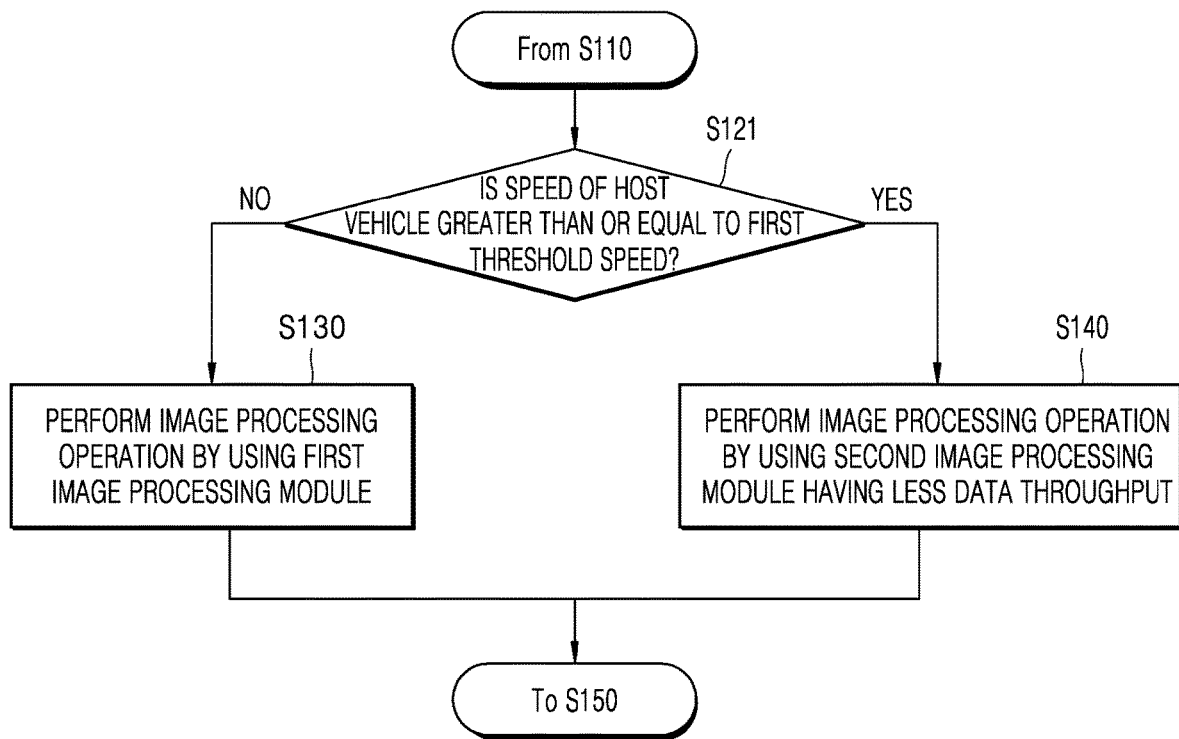
FIG. 4 is a flowchart of an image processing operation according to an example embodiment of the inventive concept.

FIG. 4 is a flowchart of the image processing operation according to an example embodiment of the inventive concept. FIG. 4 is a diagram of an operation of determining a necessity or desirability of the high speed performance of the image processing operation (S120) in FIG. 3 and image processing operations (operation S130 and operation S140) in detail.

Referring to FIGS. 1, 3, and 4, after obtaining the first image of the host vehicle surrounding environment (from S110), the electronic device 10 may determine whether the speed of the host vehicle is greater than or equal to the first threshold speed (S121). In this case, the first threshold speed may be a speed that becomes a reference for determining that the host vehicle moves at a high speed, and may be set by a manufacturer or a user.

In an embodiment, the electronic device 10 may obtain the driving speed of the host vehicle from a speedometer detecting the driving speed of the host vehicle. In another embodiment, the electronic device 10 may obtain the driving speed of the host vehicle from the processing result of the image processing operation that has already been performed. For example, the electronic device 10 may calculate the driving speed of the host vehicle based on a moving distance between frames of a fixed object included in a previous image, from the object recognition result of the previous image.

When the speed of the host vehicle is less than the first threshold speed (S121—N), the electronic device 10 may perform the image processing operation by using the first image processing module 220 (S130). If the speed of the host vehicle is less than the first threshold speed, since the host vehicle moves at a low speed, the necessity for a fast response speed may be relatively low from a standpoint of controlling the host vehicle by using the image processing operation and the processing result of the electronic device 10. Accordingly, the electronic device 10 may perform the image processing operation by using the first image processing module 220.

On the other hand, when the speed of the host vehicle is greater than or equal to the first threshold speed (S121—YES), the electronic device 10 may perform the image processing operation by using the second image processing module 230 having less data processing throughput than the first image processing module 220. When the speed of the host vehicle is greater than or equal to the first threshold speed, because the host vehicle is currently moving at a high speed and thus moves a large distance during a unit time period, the necessity for a fast response speed may be relatively high from a standpoint of controlling the host vehicle by using the image processing operation and the processing result of the electronic device 10. Accordingly, the electronic device 10 may perform the image processing operation by using the second image processing module 220 having less data processing throughput.

Then, when the image processing operation is completed, the electronic device 10 may proceed to next operation S150.

As such, the electronic device 10 according to the inventive concept may select the image processing module used for the image processing operation according to whether the host vehicle moves at a low speed or at a high speed. In other words, the electronic device 10 according to the inventive concept may adaptively apply the image processing method according to the driving speed of the host vehicle.

Figure 5:
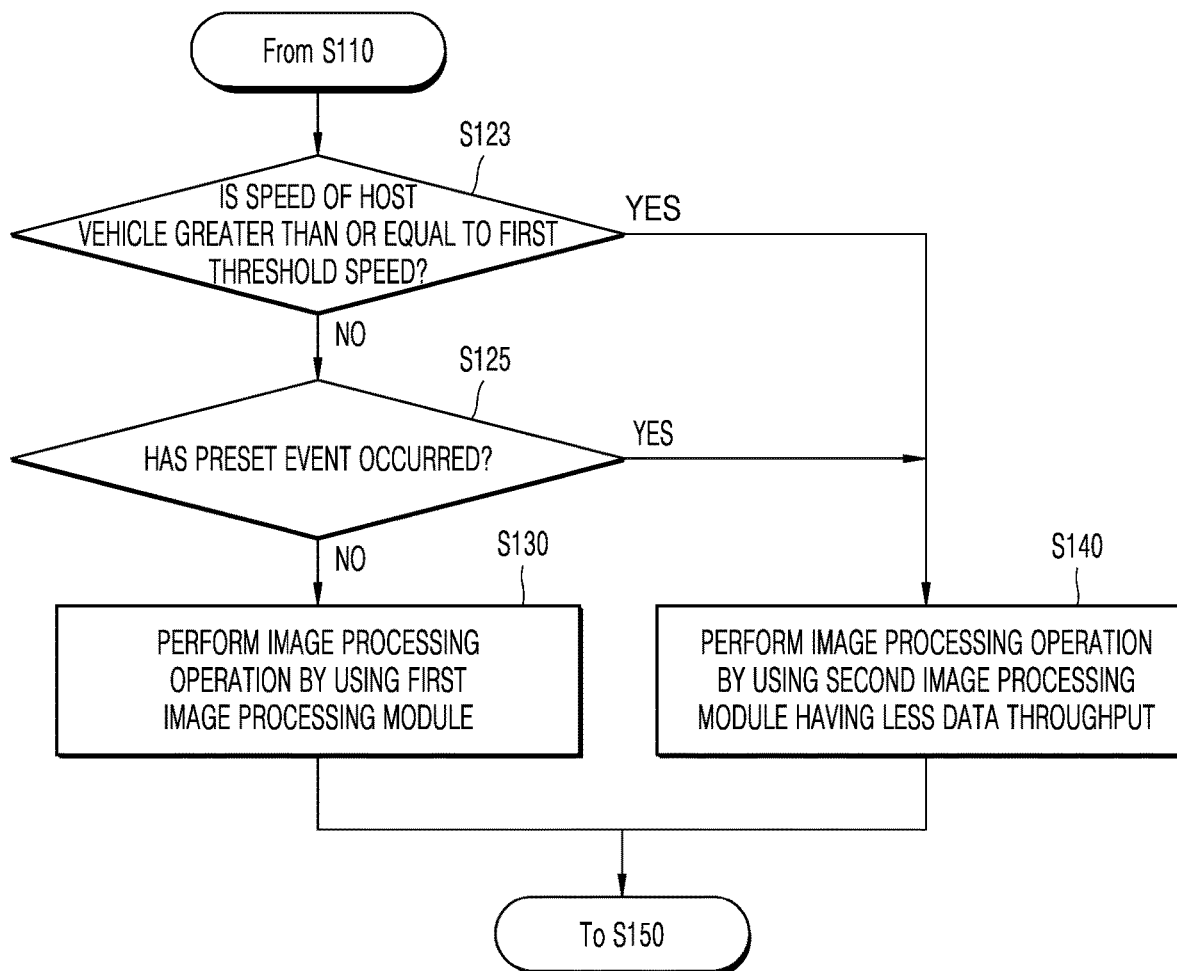
FIG. 5 is a flowchart of the image processing operation according to an example embodiment of the inventive concept.

FIG. 5 is a flowchart of the image processing operation according to an example embodiment of the inventive concept. FIG. 5 is a flowchart of a modifiable embodiment of FIG. 4, and is a flowchart of operations of determining a necessity or desirability for the high speed performance of the image processing operation in FIG. 3 (S120) and the image processing operations (S130 and S140) in detail.

Referring to FIGS. 1, 3, and 5, the electronic device 10 may identify whether the speed of the host vehicle is equal to or greater than the first threshold speed (S123). When the speed of the host vehicle is greater than or equal to the first threshold speed (S123—Y), the electronic device 10 may perform the image processing operation by using the second image processing module 230 having less data processing throughput than the first image processing module 220.

However, when the speed of the host vehicle is less than the first threshold speed (S121—N), the electronic device 10 may determine whether the preset event has occurred (S125). The electronic device 10 may determine whether the preset event has occurred based on at least one of the driving information about the host vehicle and the surrounding environment information about the host vehicle. In this case, the preset event mean various events in which dangerous situations are detected, such as when a nearby vehicle is very close to the host vehicle, the speed of the nearby vehicle is rapidly reduced, and the normal speed or the speed limit of a road on which the host vehicle moves exceeds the threshold speed. A type of the preset event is not limited to the above-described examples, and may be set by the manufacturer or the user. Detailed examples of the determination operation of the preset event are described later with reference to FIGS. 6A through 6C.

When the preset event has not occurred (S125—N), the electronic device 10 may perform the image processing operation by using the first image processing module 220 (S130). When the preset event has not occurred, the current host vehicle may not be in a dangerous situation, and thus the need for a fast reaction speed may be relatively low from a standpoint of controlling the host vehicle by using the image processing operation and the processing result of the electronic device 10. Accordingly, the electronic device 10 may perform the image processing operation by using the first image processing module 220.

However, when the preset event has occurred (S125—Y), the electronic device 10 may perform the image processing operation by using the second image processing module 230 (S140). When the preset event occurs, the present host vehicle may be in a dangerous situation, and thus the need for a fast reaction speed may be relatively high from a standpoint of controlling the host vehicle by using the image processing operation and the processing result of the electronic device 10. For example, even when the host vehicle 400 moves at a low speed less than the first threshold speed, and a vehicle in front of the host vehicle 400 suddenly applies the brakes, the necessity for the fast reaction may be required by increasing the image processing speed. Accordingly, the electronic device 10 may perform the image processing operation by using the second image processing module 220 having less data processing throughput.

Then, when the image processing operation is completed, the electronic device 10 may proceed to next operation S150.

The electronic device 10 according to the present embodiment may select an image processing module used for the image processing operation according to whether the preset event occurs. For example, the electronic device 10 according to the present embodiment may adaptively apply the image processing method according to whether the host vehicle is in a dangerous situation.

In FIG. 5, operation S123 is illustrated and described as preceding operation S125, however, the present disclosure is not limited thereto. For example, the present disclosure may be implemented in a manner in which operation S125 precedes operation S123, or may be implemented in a manner in which only operation S125 is performed according to an embodiment.

Figure 6A:
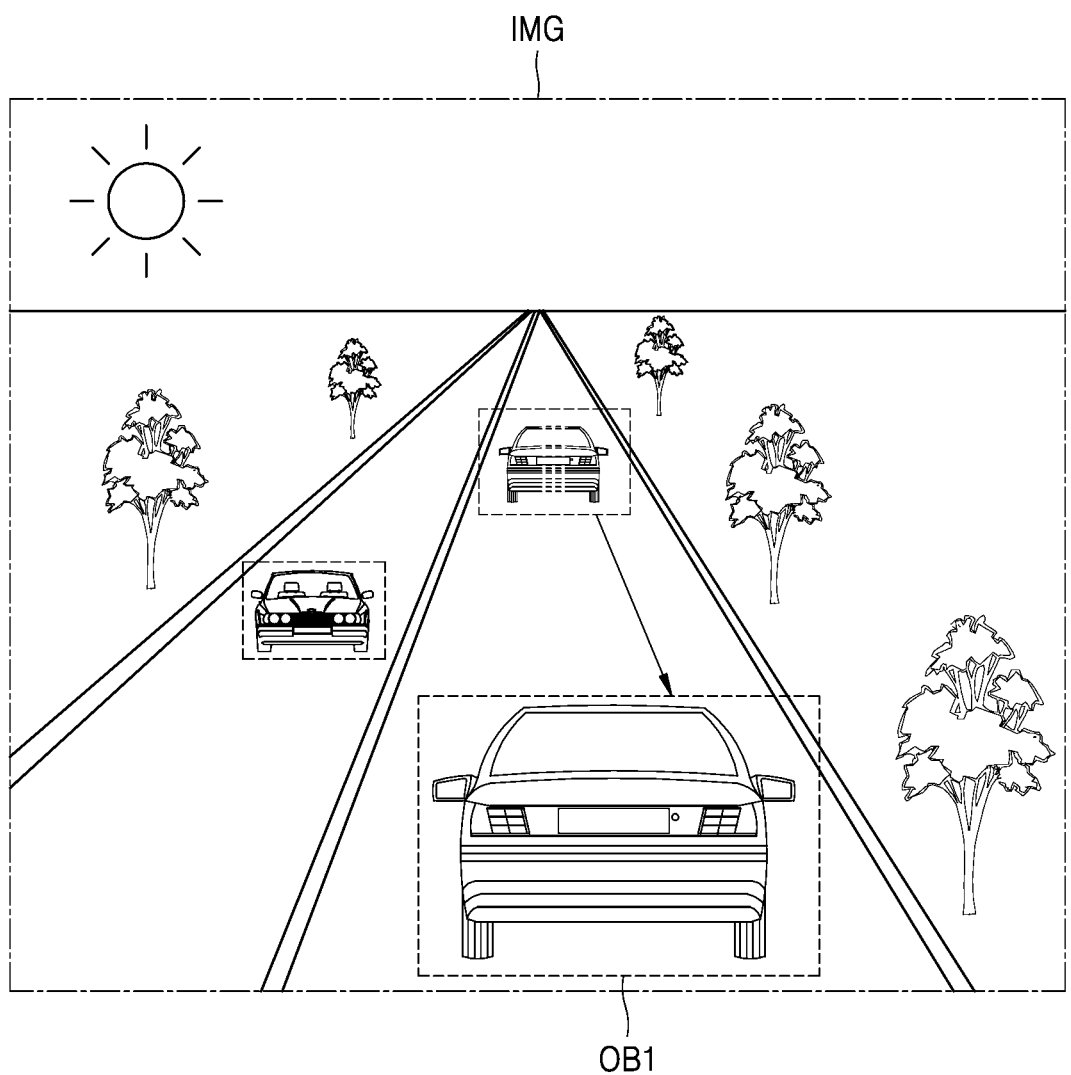
FIGS. 6A through 6C are diagrams illustrating preset events, according to example embodiments of the inventive concept.
Figure 6B:
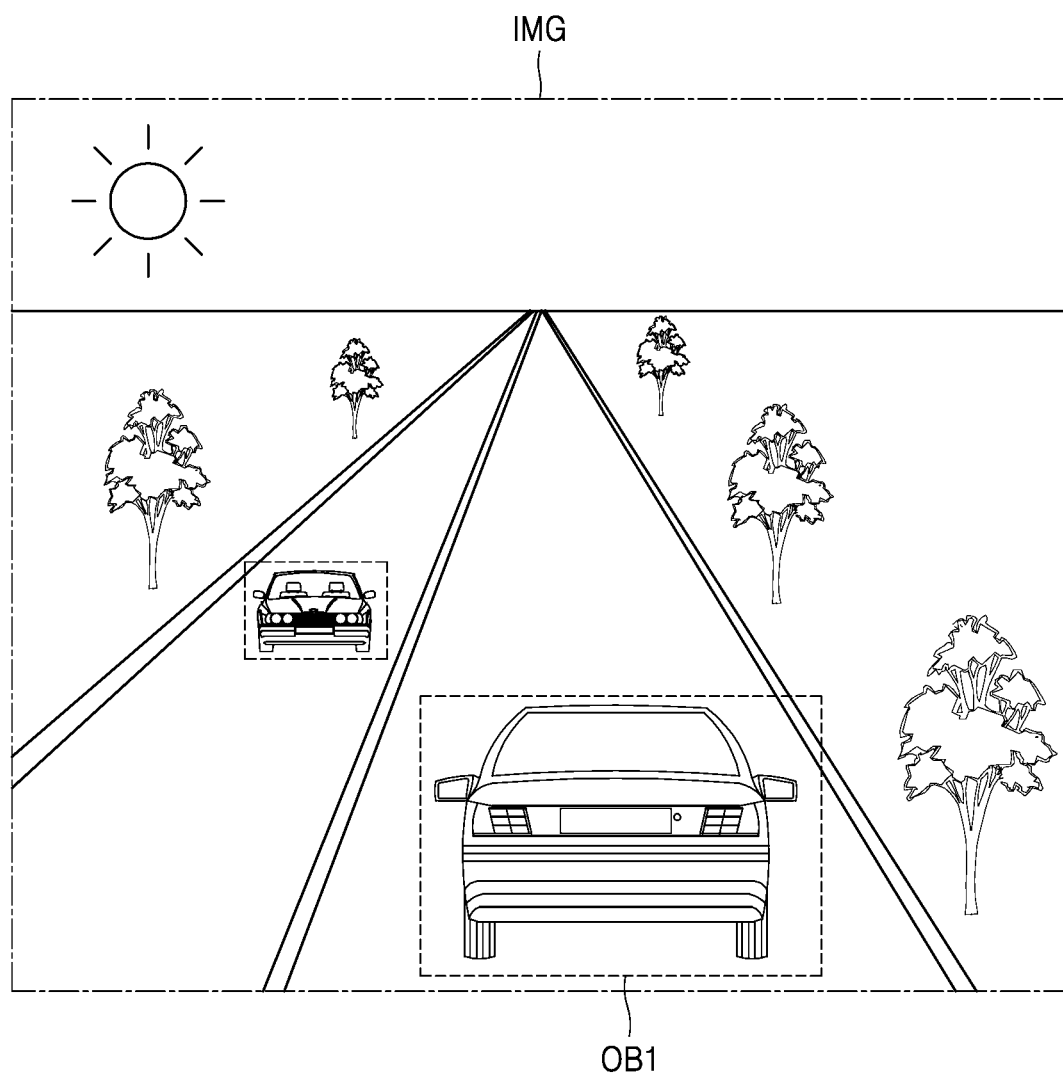
Figure 6C:
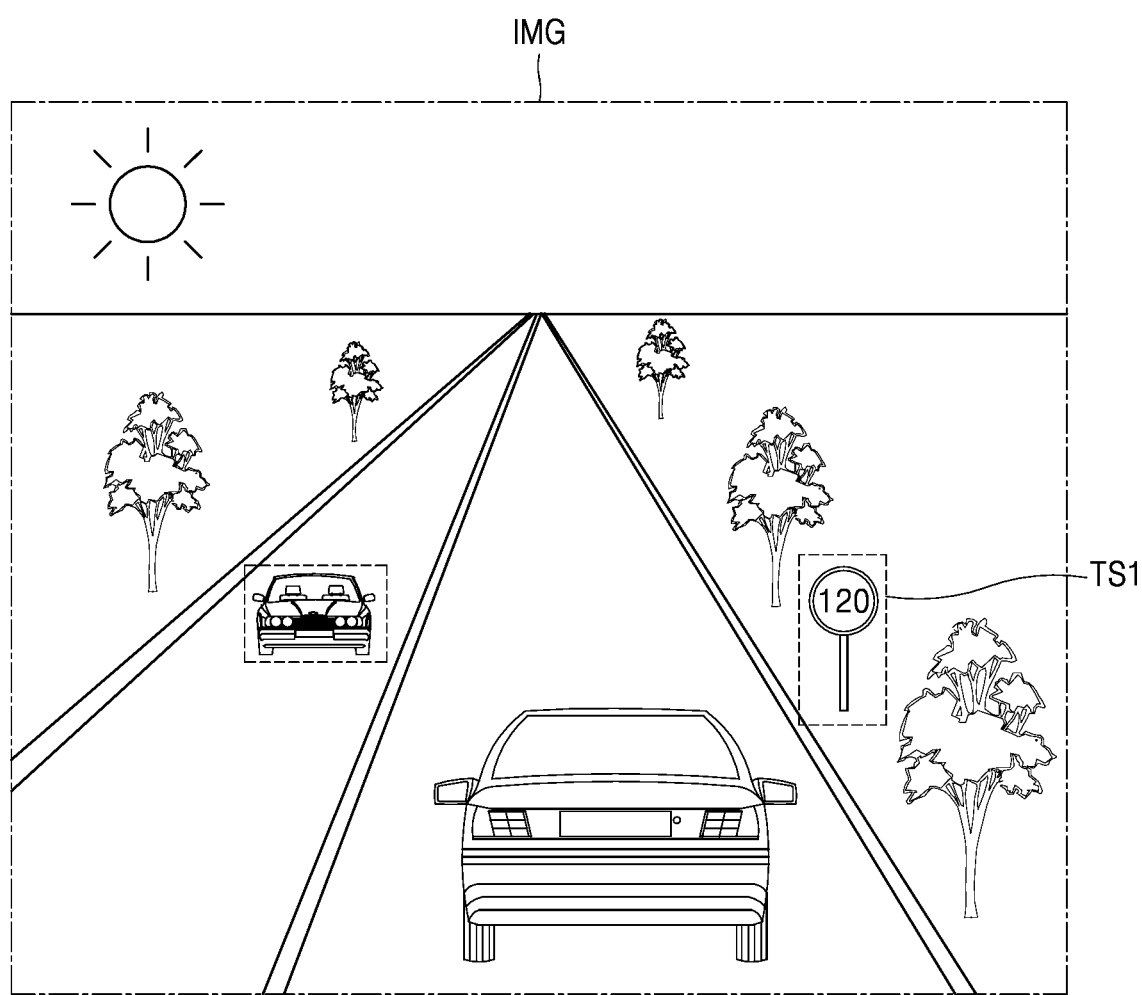

FIGS. 6A through 6C are diagrams illustrating the preset events, according to example embodiments of the inventive concept. FIG. 6A is a diagram illustrating a situation in which the speed of a nearby vehicle adjacent to the host vehicle rapidly decreases, FIG. 6B is a diagram illustrating a situation in which the nearby vehicle is very close to the host vehicle, and FIG. 6C is a diagram illustrating a situation in which the speed limit of a road on which the host vehicle moves exceeds the threshold speed.

The electronic device 10 may determine whether the preset event has occurred by using the processing result of the image processing operation that has already been performed. Hereinafter, a method of determining the occurrence of various types of preset events is described with reference to FIGS. 6A through 6C.

The electronic device 10 may calculate a speed change of the nearby vehicle based on information about the nearby vehicle commonly included in the previous image. For example, referring to FIG. 6A, the electronic device 10 may calculate the speed change of a nearby vehicle OBE based on the moving distance between frames of the nearby vehicle OB1 commonly included in a previous image IMG among the object recognition result already performed. As another example, the electronic device 10 may calculate the speed change of the nearby vehicle OB1 based on a change in size of the peripheral vehicle OB1 between the frames commonly included in the previous image IMG. However, a method of calculating the speed change of the nearby vehicle OB1 is not limited to the above-described examples, and various methods may be applied.

In addition, when the electronic device 10 identifies a sharp decrease in the speed of the nearby object OB1 in FIG. 6A, there is a risk of collision with the host vehicle, and thus, it may be determined that the preset event has occurred.

In addition, the electronic device 10 may determine whether the host vehicle is within a threshold distance from the nearby vehicle OB1, based on a location of the nearby vehicle OB1 included in the previous image IMG. In this case, the threshold distance may mean a stop distance to avoid collision between vehicles, may be set in proportion to the present speed of the host vehicle, and may be set by a manufacturer or a user. For example, referring to FIG. 6B, the electronic device 10 may determine whether the host vehicle is in the threshold distance from the nearby vehicle OB1, based on the location of the nearby vehicle OB1 included in the previous image IMG among the object recognition results already performed.

In addition, when the electronic device 10 identifies that a distance between the nearby object OB1 and the host vehicle is within the threshold distance, there may be a risk of collision with the host vehicle, and thus it may be determined that the preset event has occurred.

In addition, the electronic device 10 may determine whether the speed limit of the road on which the host vehicle moves is greater than or equal to a second threshold speed, based on a traffic sign in the previous image IMG. In this case, the second threshold speed may generally mean a minimum value of a speed limit of a road on which a vehicle moves at a high speed, and may be set by a manufacturer or a user. For example, referring to FIG. 6C, the electronic device 10 may identify the speed limit (for example, about 120 km/h) of a traffic sign TS1 included in the previous image IMG among the object recognition results already performed, and determine whether the speed limit (for example, about 120 km/h) is greater than or equal to the second threshold speed (for example, about 100 km/h).

In addition, when identifying that the speed limit of the traffic sign TS1 in FIG. 6C is greater than or equal to the second threshold speed, the electronic device 10 may determine that the preset event has occurred because the host vehicle is likely to move at a high speed, or because other vehicles may be traveling at high speeds.

However, the operation of the electronic device 10 to determine the occurrence of the preset event by identifying the traffic sign TS1 is not limited to the above-described example. For example, the electronic device 10 may determine that the preset event has occurred when the normal speed of the traffic sign TS1 is greater than or equal to the first threshold speed (that is, a speed that is a reference for determining whether the host vehicle moves at a high speed). In another example, the electronic device 10 may use global positioning system (GPS) information about the host vehicle, identify the road on which the host vehicle moves from map information, identify information about the normal speed or the speed limit of the road from the map information, and determine whether the preset event has occurred.

Figure 7:
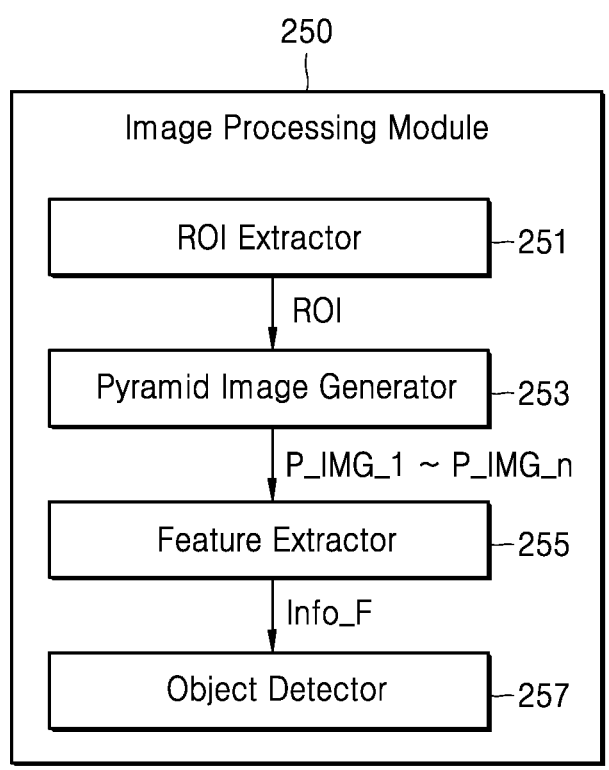
FIG. 7 is a block diagram of an image processing module according to an example embodiment of the inventive concept.

FIG. 7 is a block diagram of an image processing module 250 according to an example embodiment of the inventive concept.

The image processing module 250 of FIG. 7 may correspond to the first image processing module 220 or the second image processing module 230 in FIG. 1. Referring to FIG. 7, the image processing module 250 may include a region of interest (ROI) extractor 251, a pyramid image generator 253, a feature extractor 255, and an object detector 257.

The ROI extractor 251 may extract the ROI from an image. In this case, the ROI may be referred to as a region selected for object detection. In an embodiment, the ROI extractor 251 may receive an image from the image sensor (100 in FIG. 1), and extract the ROI from the received image.

The ROI extractor 251 may extract the ROI in various ways. In an embodiment, the ROI extractor 251 may extract the ROI based on a vanishing point of the image. For example, the ROI extractor 251 may extract a region of a certain size including the vanishing point of the image as the ROI. However, a method, performed by the ROI extractor 251, of extracting the ROI is not limited to the above-described example, and the ROI may be extracted in various ways.

The pyramid image generator 253 may generate a plurality of pyramid images having different scales from each other. In an embodiment, the pyramid image generator 253 may generate a preset number of first through $n^{th}$ pyramid images P_IMG_1 through P_IMG_n having different scales from each other by using the ROI.

The feature extractor 255 may generate feature information Info_F by extracting features of the image by using a plurality of images. In an embodiment, the feature extractor 255 may extract features of the image by moving a search window of a fixed size on the first through $n^{th}$ pyramid images P_IMG_1 through P_IMG_n and generate feature information Info_F.

The object detector 257 may perform the object recognition operation or the segmentation operation based on the feature information Info_F, and may generate object recognition information or object segmentation information. The generated object recognition information or the generated object segmentation information may be used to control the host vehicle.

The ROI extractor 251, the pyramid image generator 253, the feature extractor 255, and the object detector 257 may respectively be implemented with firmware or software, be loaded in the memory 200, and then executed by the processor 300. However, the present disclosure is not limited thereto, and the ROI extractor 251, the pyramid image generator 253, the feature extractor 255, and the object detector 257 may respectively be implemented with hardware, or a combination type of software and hardware.

Hereinafter, an operation method of the image processing module 250 is described in detail with reference to FIGS. 8A through 10.

Figure 8A:
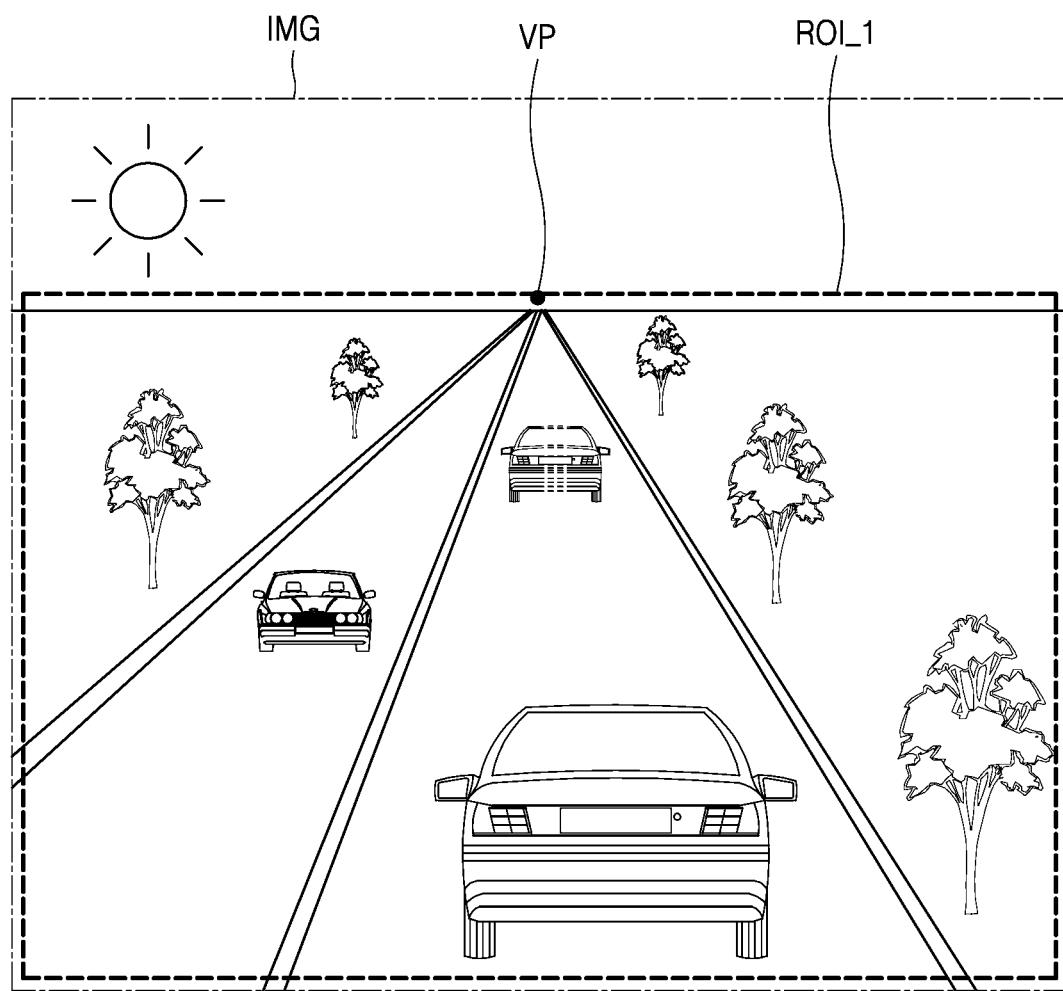
FIGS. 8A and 8B are diagrams of a region of interest (ROI) extraction operation, according to example embodiments of the inventive concept.
Figure 8B:
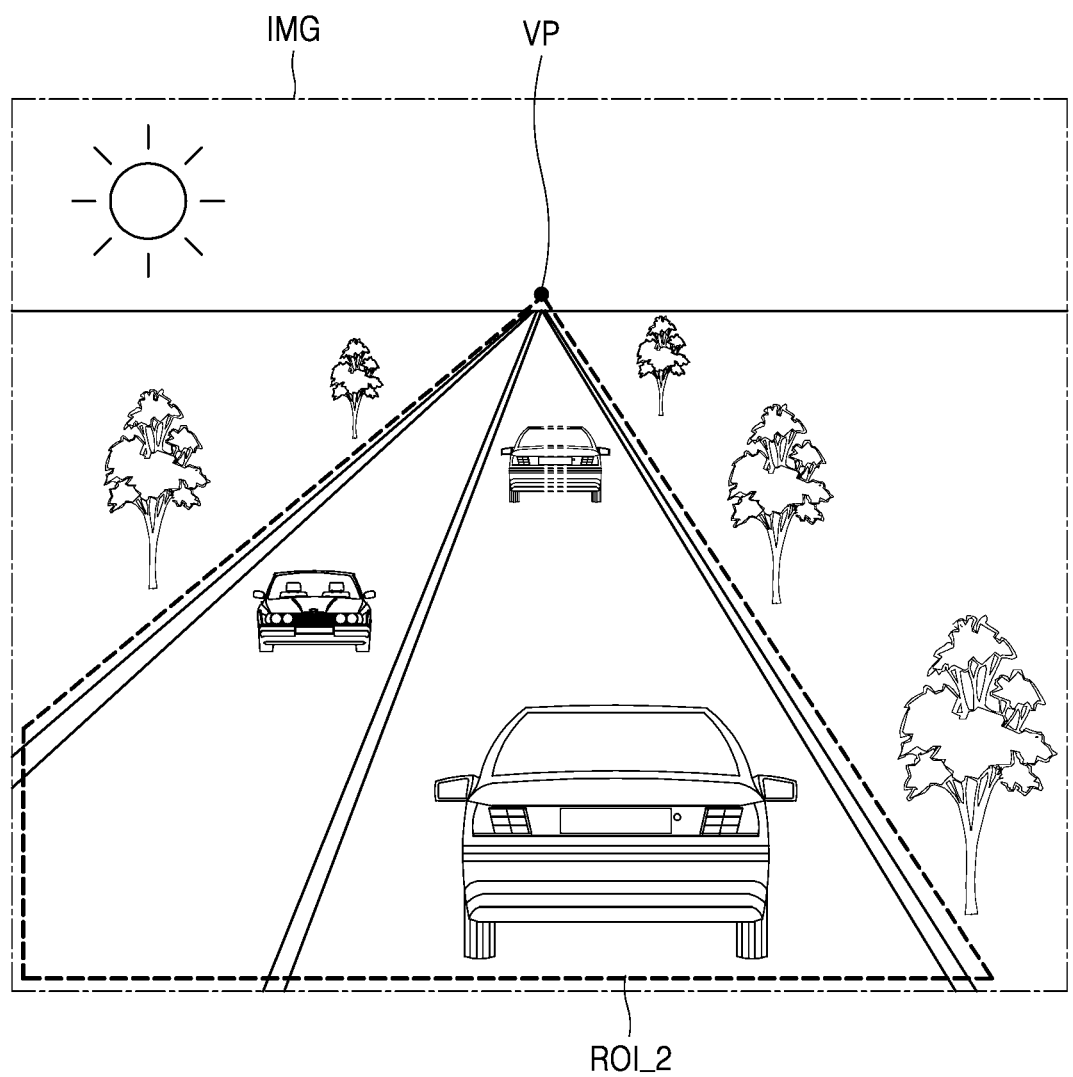

FIGS. 8A and 8B are diagrams of the ROI extraction operation, according to example embodiments of the inventive concept. In detail, FIG. 8A is a diagram of the extraction operation of the ROI of the first image processing module 220 in FIG. 1, and FIG. 8B is a diagram of the extraction operation of the ROI of the second image processing module 230 in FIG. 1.

In an embodiment, the first image processing module 220 may extract the ROI by using the vanishing point of the image. For example, referring to FIG. 8A, the first image processing module 220 may identify a vanishing point VP of the image IMG, identify a parallel line including the vanishing point VP, and extract a region below the identified parallel line of the image IMG as a first ROI ROI_1.

The second image processing module 230 may extract an ROI having a smaller size than an ROI extracted by the first image processing module 230. For example, referring to FIG. 8B, the second image processing module 230 may identify a road area of the image IMG based on the vanishing point VP of the image IMG, and extract the identified road area as a second ROI ROI_2. Because the vanishing point VP is obtained by extending edges of the road in the image IMG and identifying an overlapping point, the second ROI ROI_2 in FIG. 8B may have less features than the first ROI ROI_1 in FIG. 8A.

However, the method in which the first image processing module 220 and the second image processing module 230 extract the first and second ROIs ROI_1 and ROI_2 are not limited to the above-described examples, and may be implemented to extract the ROIs according to various methods. The various methods may be sufficient as long as the ROI of the second image processing module 230 has fewer features than the ROI of the first image processing module 220.

Figure 9A:
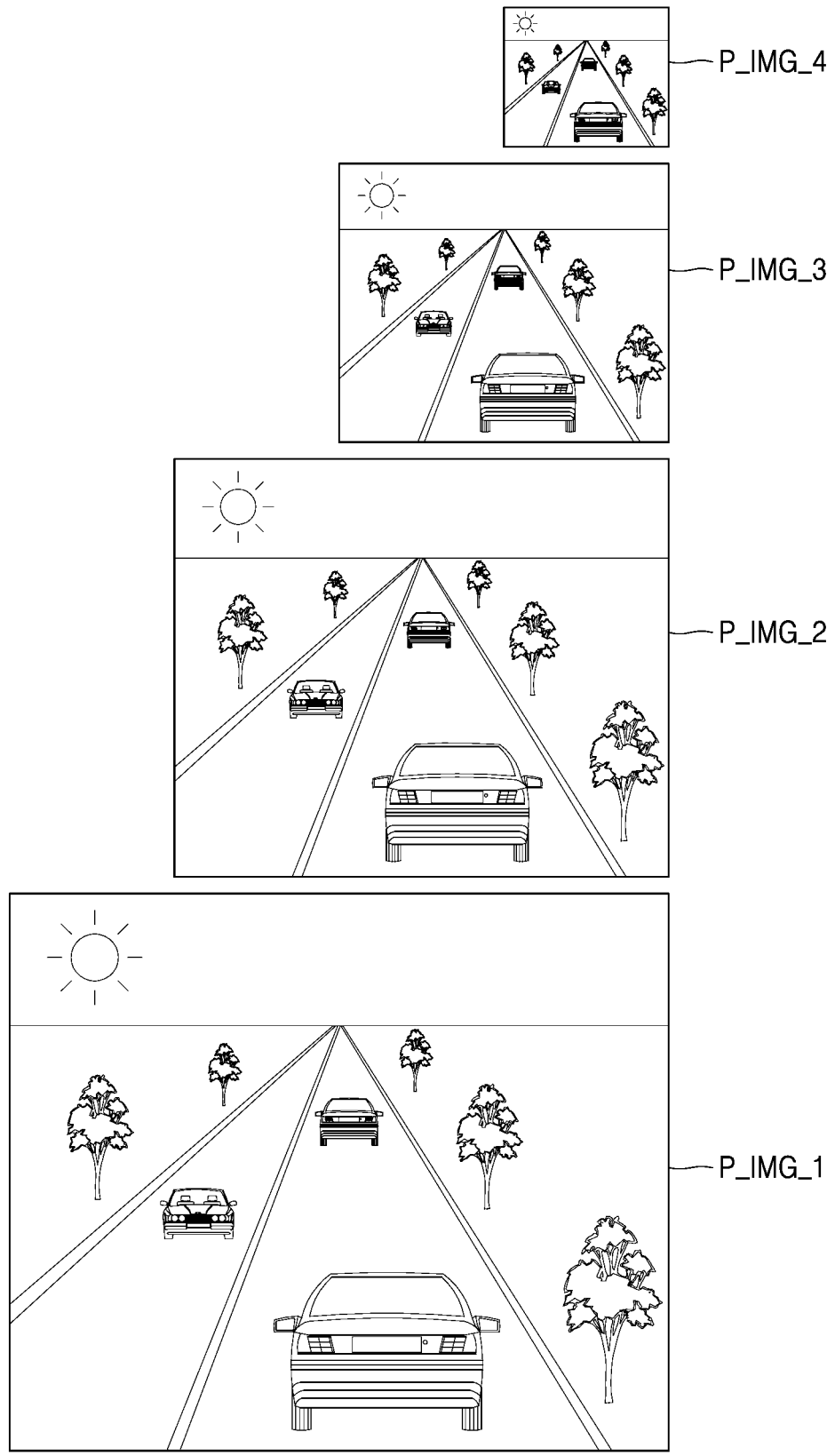
FIGS. 9A and 9B are diagrams illustrating a generating operation of a plurality of pyramid images, according to example embodiments of the inventive concept.
Figure 9B:
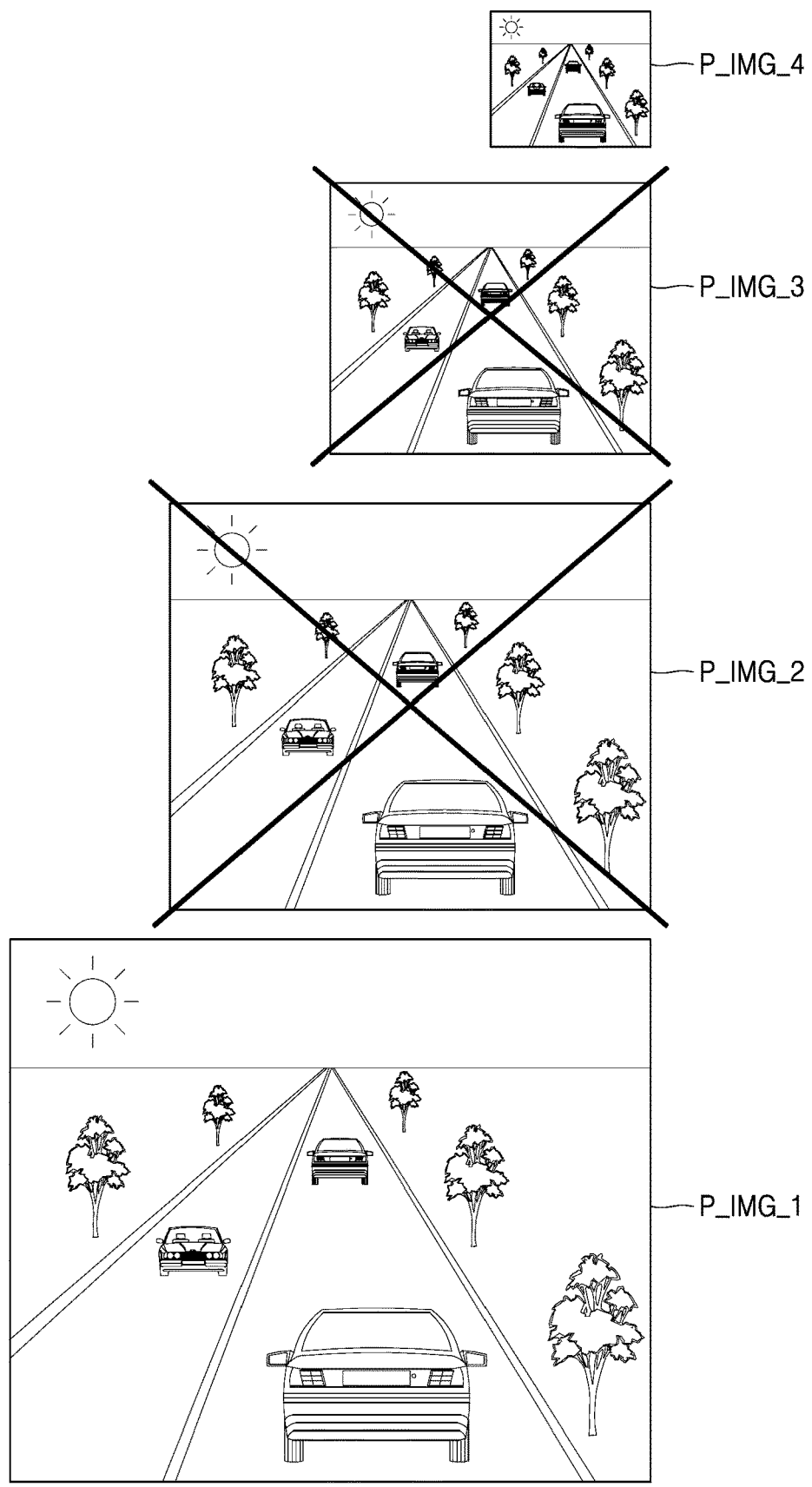

FIGS. 9A and 9B are diagrams illustrating a generating operation of a plurality of pyramid images, according to example embodiments of the inventive concept. FIG. 9A is a diagram of an operation of generating the plurality of pyramid images of the first image processing module 220 in FIG. 1, and FIG. 9B is a diagram of an operation of generating the plurality of pyramid images of the second image processing module 230 in FIG. 1.

Referring to FIGS. 1, 7, 9A, and 9B, the first image processing module 220 and the second image processing module 230 may receive the image IMG from the image sensor 100, and generate the plurality of pyramid images based on the received image IMG. For example, the first image processing module 220 and the second image processing module 230 may generate pyramid images having scales that are the same as or different from the image IMG received from the image sensor 100.

However, the present disclosure is not limited to thereto, and the first image processing module 220 and the second image processing module 230 may receive the ROI from the ROI extractor 251, and generate the plurality of pyramid images based on the received ROI. For example, the first image processing module 220 and the second image processing module 230 may generate the pyramid images having scales that are the same as or different from the received ROI.

Hereinafter, for convenience of description, a method is described of generating the plurality of pyramid images based on the image IMG received from the image sensor 100. In an embodiment, the first image processing module 220 may generate M (M is a positive integer) pyramid images. For example, referring to FIG. 9A, the first image processing module 220 may generate a first pyramid image P_IMG_1, a second pyramid image P_IMG_2, a third pyramid image P_IMG_3, and a fourth pyramid image P_IMG_4, which have different scales from each other.

In addition, the second image processing module 230 may generate N (N is a positive integer less than M) pyramid images. For example, referring to FIG. 9B, the second image processing module 230 may generate the first pyramid image P_IMG_1 and the fourth pyramid image P_IMG_4, which have different scales from each other. The first pyramid image P_IMG_1 and the fourth pyramid image P_IMG_4 may have the same scale as the first pyramid image P_IMG_1 and the fourth pyramid image P_IMG_4 generated by the first image processing module 220 in FIG. 9A. In this manner, the second image processing module 230 may generate at least some of the plurality of pyramid images generated by the first image processing module 220.

On the other hand, in a modifiable embodiment, the second image processing module 230 may generate a number (for example, 2) of pyramid images that is less than the number (for example, 4) of pyramid images generated by the first image processing module 220, while generating the pyramid images having scales different from those of the pyramid images generated by the first image processing module 220. For example, when the first image processing module 220 generates four pyramid images respectively having scales of about 100%, about 50%, about 25%, and about 12.5%, the second image processing module 230 may generate two pyramid images respectively having scales of about 80% and about 40%. However, the scales of the pyramid images generated by the first image processing module 220 and the second image processing module 230 are not limited to the above-described examples, and pyramid images having various scales may be generated.

In FIGS. 9A and 9B, the first image processing module 220 and the second image processing module 230 are illustrated and described as generating four and two pyramid images, respectively, but the present disclosure is not limited thereto. An embodiment may be sufficient as long as the number of pyramid images generated by the second image processing module 230 is less than the number of pyramid images generated by the first image processing module 220.

Figure 10:
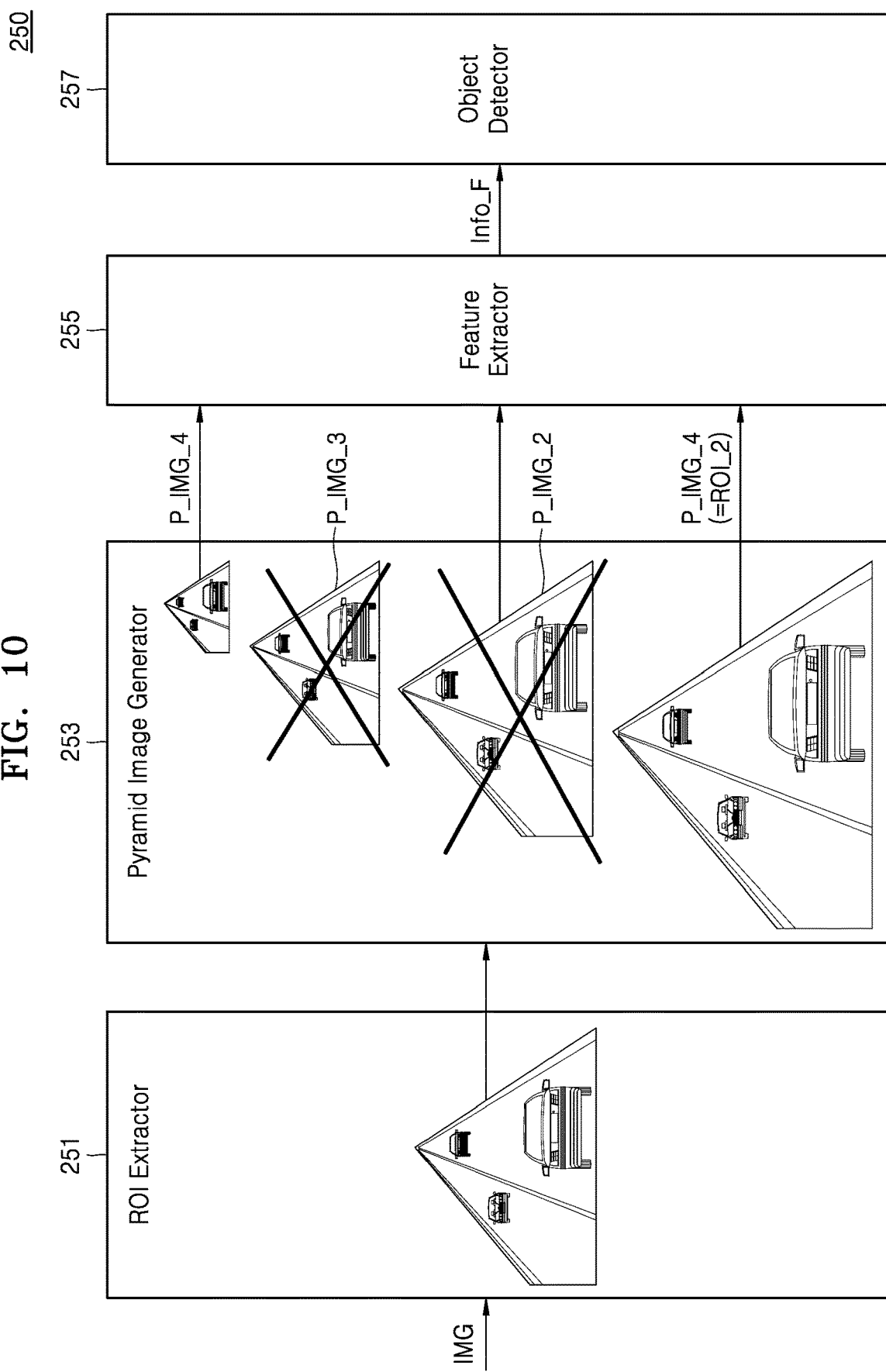
FIG. 10 is a diagram of an image processing operation of a second image processing module, according to an embodiment of the inventive concept.

FIG. 10 is a diagram of the image processing operation of the second image processing module 250, according to an embodiment of the inventive concept. FIG. 10 is a diagram of the image processing operation of the image processing module 250 of FIG. 7. The image processing module 250 of FIG. 10 may correspond to the second image processing module 230 in FIG. 1. Hereinafter, the image processing module 250 of FIG. 10 is referred to as a second image processing module 250 to distinguish the image processing module 250 from the first image processing module 220 in FIG. 1. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Referring to FIGS. 1, 7, 8B, 9B, and 10, the ROI extractor 251 of the second image processing module 250 may receive the image IMG from the image sensor 100, and extract the second ROI ROI_2 from the received image IMG. For example, the ROI extractor 251 may identify a road region of the image IMG based on the vanishing point VP of the image IMG, and extract the identified road region as the second ROI ROI_2. Then, the ROI extractor 251 may transmit the extracted second ROI ROI_2 to the pyramid image generator 253.

The pyramid image generator 253 may generate the plurality of pyramid images having different scales from each other based on the received second ROI ROI_2. For example, the pyramid image generator 253 may generate the first and fourth pyramid images P_IMG_1 and P_IMG_4 having scales that are the same as or different from the received second ROI ROI_2. In addition, the pyramid image generator 253 may transmit the generated first and fourth pyramid images P_IMG_1 and P_IMG_4 to the feature extractor 255.

The feature extractor 255 may obtain feature information Info_F based on the received first and fourth pyramid images P_IMG_1 and P_IMG_4. In addition, the feature extractor 255 may transmit the obtained feature information Info_F to the object detector 257. The object detector 257 may perform the object recognition operation or the segmentation operation based on the received feature information Info_F. The result of the object recognition or segmentation operation of the object detector 257 may be used to control the host vehicle.

The second image processing module 250 according to an embodiment of the inventive concept may extract the ROI that is less in size than the ROI of the first image processing module (220 in FIG. 1), and generate the number of pyramid images that is less than the number of pyramid images of the first image processing module (220 in FIG. 1), and thus may reduce the overall data throughput of the image processing operation. It should be noted that compared to a first image processing module (e.g., 220 in FIG. 1), a second image processing module (e.g., 230 in FIG. 1 or 250 in FIG. 10) need not include all of the reduced image processing steps described above, but may include only some of them so that the second image processing module results in less data throughput than the first image processing module.

Figure 11:
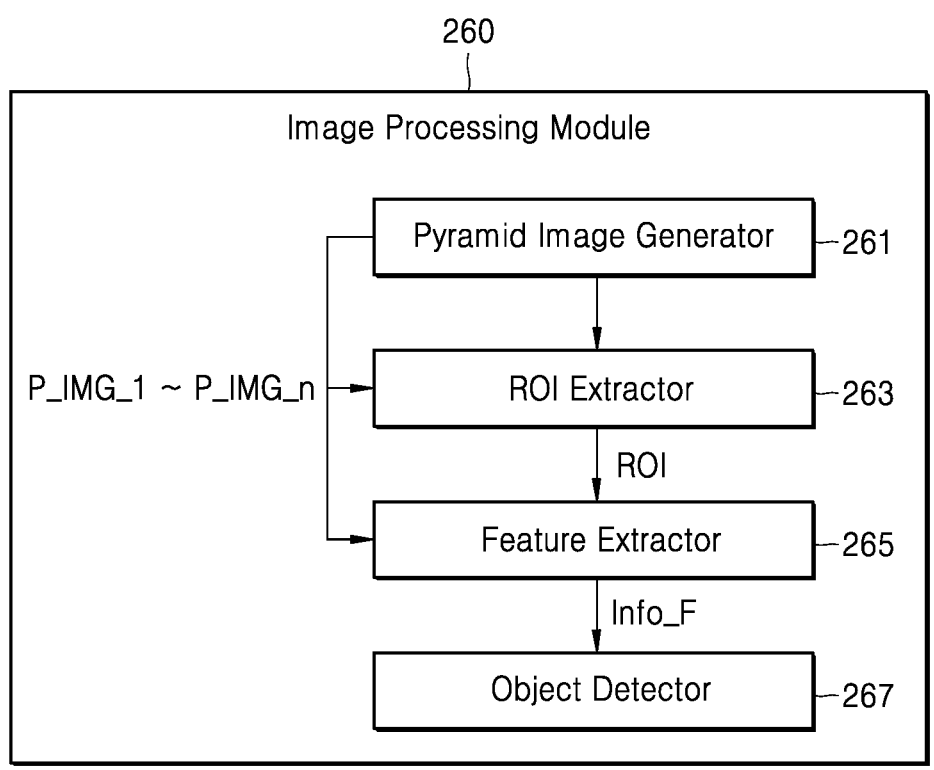
FIG. 11 is a block diagram of an image processing module according to an example embodiment of the inventive concept.

FIG. 11 is a block diagram of an image processing module 260 according to an example embodiment of the inventive concept. FIG. 11 is a diagram illustrating a modifiable embodiment of FIG. 7.

The image processing module 260 of FIG. 11 may correspond to the first image processing module 220 or the second image processing module 230 in FIG. 1. Referring to FIG. 11, the image processing module 260 may include an ROI extractor 263, a pyramid image generator 261, a feature extractor 265, and an object detector 267.

The image processing module 260 of FIG. 11 may perform the image processing operation in a different manner from the image processing module 250 of FIG. 7. Hereinafter, the image processing operation of the image processing module 260 of FIG. 11 is described in detail.

The pyramid image generator 261 may generate a plurality of pyramid images having different scales from each other. In an embodiment, the pyramid image generator 261 may receive images from the image sensor 100, and generate a preset number of first through $n^{th}$ pyramid images P_IMG1 through P_IMG_n having different scales from each other by using the received images. The pyramid image generator 261 may transmit the generated first through $n^{th}$ pyramid images P_IMG1 through P_IMG_n to the ROI extractor 263 and the feature extractor 265.

The ROI extractor 263 may extract the ROI by using one of the first through $n^{th}$ pyramid images P_IMG1 through P_IMG_n received from the pyramid image generator 261. A method, performed by the ROI extractor 263, of extracting the ROI may be substantially the same as the method described with reference to FIG. 7, and thus redundant descriptions thereof are omitted.

The feature extractor 265 may generate the feature information Info_F by extracting features of the image based on the first through $n^{th}$ pyramid images P_IMG1 through P_IMG_n and the ROI. The feature extractor 265 may mask the remaining regions except for the target region corresponding to the ROI for each of the first through $n^{th}$ pyramid images P_IMG1 through P_IMG_n, extract features of the image from the target region of each of the first through nth pyramid images P_IMG1 through P_IMG_n, and generate the feature information Info_F.

The object detector 267 may perform the object recognition operation or the segmentation operation based on the feature information Info_F, and may generate the object recognition information or the object segmentation information. The generated object recognition information or the generated object segmentation information may be used to control the host vehicle.

Figure 12:
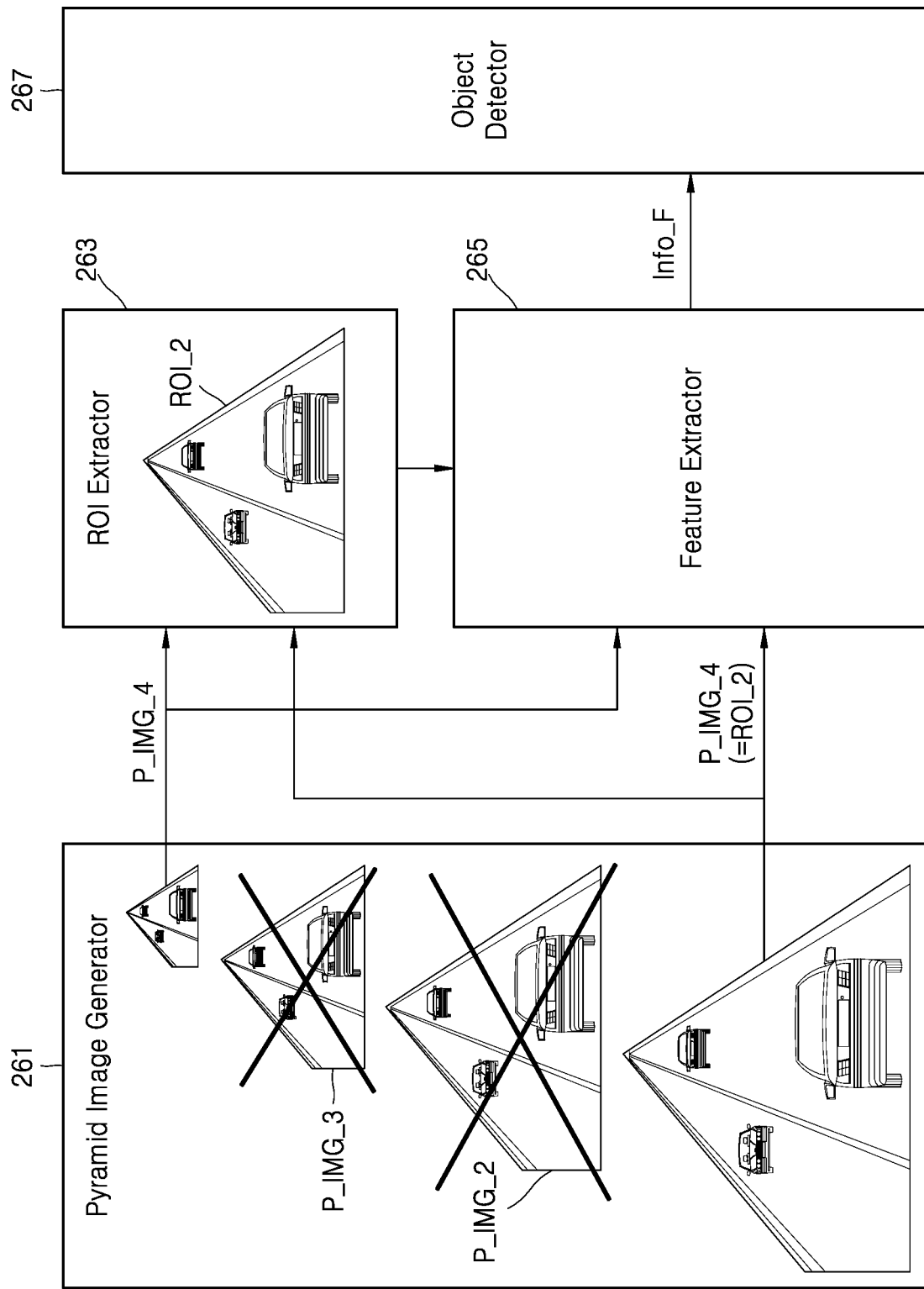
FIG. 12 is a diagram for explaining an image processing operation of a second image processing module, according to an embodiment of the inventive concept.

FIG. 12 is a diagram of the image processing operation of the second image processing module 260, according to an embodiment of the inventive concept. FIG. 12 is a diagram of the image processing operation of the image processing module 260 of FIG. 11. The image processing module 260 of FIG. 12 may correspond to the second image processing module 230 in FIG. 1. Hereinafter, the image processing module 260 of FIG. 12 is referred to as a second image processing module 260 to distinguish the image processing module 260 from the first image processing module 220 in FIG. 1.

Referring to FIGS. 1, 11, and 12, the pyramid image generator 261 of the second image processing module 260 may generate a plurality of pyramid images having different scales from each other based on the image IMG received from the image sensor 100. For example, the pyramid image generator 261 may generate the first and fourth pyramid images P_IMG_1 and P_IMG_4 having scales that are the same as or different from the received image IMG. In addition, the pyramid image generator 261 may transmit the generated first and fourth pyramid images P_IMG1 and P_IMG_4 to the ROI extractor 263 and the feature extractor 265.

The ROI extractor 263 may receive the first and fourth pyramid images P_IMG_1 and P_IMG_4 received from the pyramid image generator 261, and extract the second ROI ROI_2 by using one of them. For example, the ROI extractor 263 may identify the road region based on the vanishing point VP of the first image P_IMG_1, and extract the identified road region as the second ROI ROI_2. Then, the ROI extractor 263 may transmit the extracted second ROI ROI_2 to the feature extractor 265.

The feature extractor 265 may generate the feature information Info_F by extracting features of the image IMG based on the first and fourth pyramid images P_IMG1 and P_IMG_4 and the second ROI ROI_2. The feature extractor 265 may mask the remaining regions except for the target region (that is, the road region) corresponding to the second ROI ROI_2 for each of the first and fourth pyramid images P_IMG_1 and P_IMG_4, extract features of the image IMG from the target region (that is, the road region) of each of the first and fourth pyramid images P_IMG_1 and P_IMG_4, and generate the feature information Info_F. In addition, the feature extractor 265 may transmit the generated feature information Info_F to the object detector 267. The object detector 267 may perform the object recognition operation or the segmentation operation based on the received feature information Info_F. The result of the object recognition or segmentation operation of the object detector 267 may be used to control the host vehicle.

Figure 13:
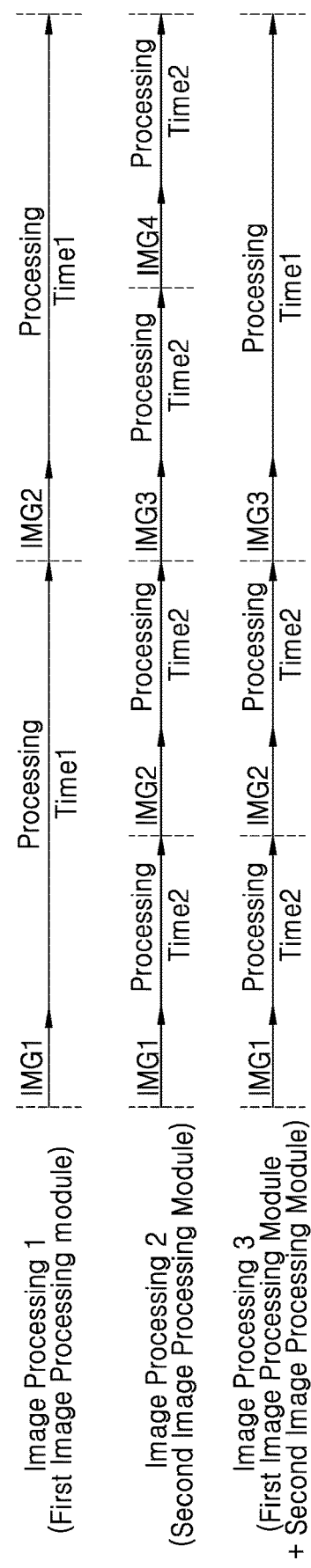
FIG. 13 illustrates timing diagrams illustrating image processing operations using a plurality of image processing modules, according to an example embodiment of the inventive concept.

FIG. 13 illustrates timing diagrams illustrating image processing operations using a plurality of image processing modules, according to an example embodiment of the inventive concept. FIG. 13 illustrates timing diagrams of the image procession operations by using the first image processing module 220 and the second image processing module 230 by the processor 300 in FIG. 1. Referring to FIG. 13, a first image processing Image Processing 1 may represent a timing diagram in which the image processing operation is performed by using only the first image processing module 220, a second image processing Image Processing 2 may represent a timing diagram in which the image processing operation is performed by using only the second image processing module 230, and a third image processing operation Image Processing 3 may represent a timing diagram in which the image processing operation is performed by both the first image processing module 220 and the second image processing module 230.

Referring to FIGS. 1 and 13, the processor 300 may perform the image processing operation by alternately using the first image processing module 220 and the second image processing module 230. When receiving a first image IMG1, the processor 300 may determine the need for the high speed performance of the image processing operation by using the information Info_V about the host vehicle. When the high speed performance is determined or indicated as required or desirable, the processor 300 may perform the image processing operation by using the second image processing module 230 on a preset number of consecutive images including the first image IMG1. For example, referring to FIG. 13, the processor 300 may perform the image processing operation by using the second image processing module 230 on two consecutive images (that is, the first image IMG1 and a second image IMG2) including the first image IMG1, with two being merely an example.

When the image processing operation using the second image processing module 230 is completed, the processor 300 may perform the image processing operation by using the first image processing module 220 on the image next in sequence. For example, referring to FIG. 13, when the image processing operation on the first image IMG1 and the second image IMG2 by using the second image processing module 230 is completed, the processor 300 may perform the image processing operation on a third image IMG3, which is next in sequence, by using the first image processing module 220. The processor 300 may, by performing the image processing operation by using the first image processing module 220, obtain additional information (for example, information related to the remaining region except the road region in the image IMG) that has not been obtained due to features of the second image processing module 230.

When the image processing operation using the first image processing module 220 is completed, the processor 300 may determine again the need for the high speed performance of the image processing operation for the image IMG next in sequence. Alternatively, as described above, the processor 300 may repeat the image processing operation alternately using the second image processing module 230 and the first image processing module 220 on the image IMG next in sequence.

As described above, when the first image processing module 220 and the second image processing module 230 are alternately used, the processor 300 may obtain a fast response speed by using the second image processing module 230 and additional information by using the first image processing module 220.

In FIG. 13, it is described that when the processor 300 determines that the high speed performance of the image processing operation is required, the image processing operation is performed by alternately using the first image processing module 220 and the second image processing module 230, but the present disclosure is not limited thereto. For example, when the high speed performance is determined as not required, the processor 300 may perform the image processing operation by alternately using the first image processing module 220 and the second image processing module 230, and when the high speed performance is determined as required, the processor 300 may be implemented in a manner of performing the image processing operation by using only the second image processing module 230.

Figure 14:
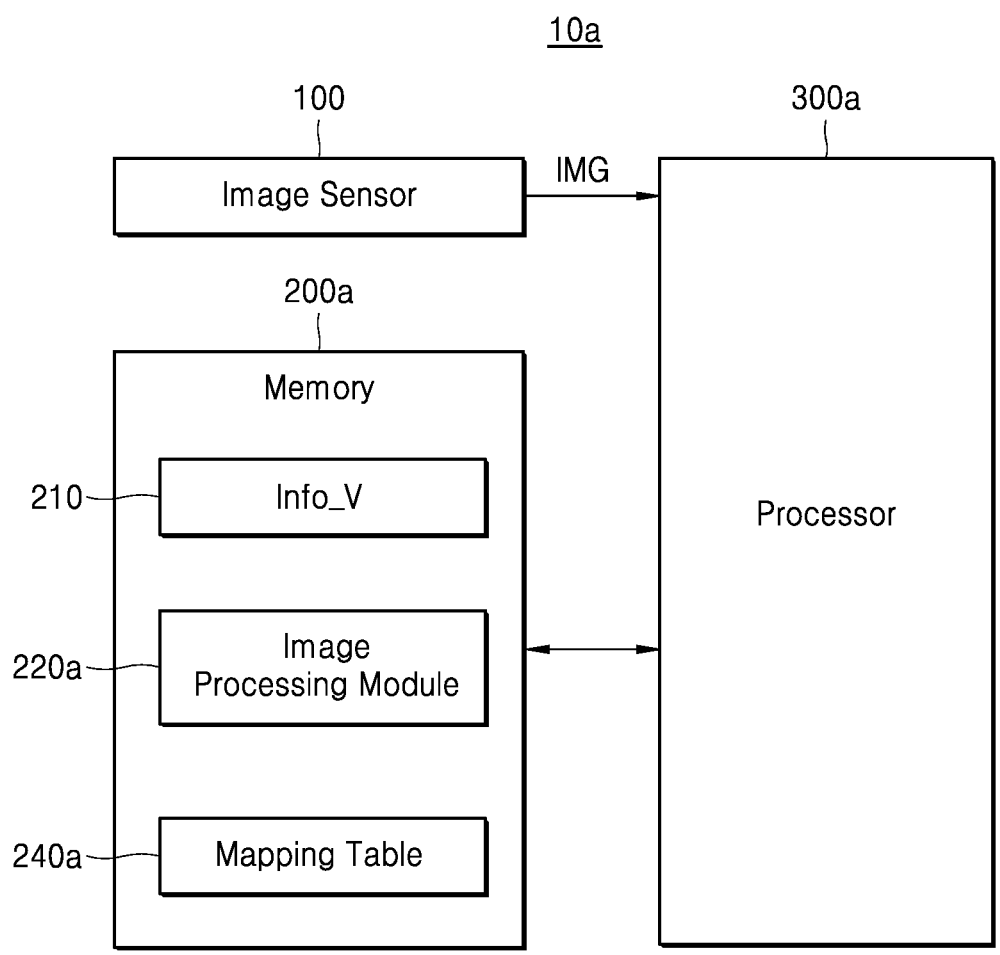
FIG. 14 is a block diagram illustrating an electronic device according to an example embodiment of the inventive concept.

FIG. 14 is a block diagram illustrating an electronic device 10*a* according to an example embodiment of the inventive concept. FIG. 14 is a diagram illustrating a modifiable embodiment of an electronic device 10 of FIG. 1. Referring to FIG. 14, the electronic device 10*a* may include the image sensor 100, a memory 200*a*, and a processor 300*a*. Because the image sensor 100 in FIG. 14 may be substantially the same as the image sensor 100 in FIG. 1, redundant descriptions thereof are omitted.

The memory 200*a* may include one image processing module 220*a*. The image processing module 220*a* may be a module designed to flexibly change operating parameters for determining an image processing method. In this case, the operation parameter may include a size of the ROI, the number of pyramid images, etc. The image processing module 220*a* may perform the image processing operation based on the operation parameters determined under the control of the processor 300*a*.

The memory 200*a* may include a mapping table 240*a*. The mapping table 240*a* may include mapping information about target latency of the image processing operation and about a mapping relationship between the operation parameters. The processor 300*a* may determine the target latency of the image processing operation based on the information about the host vehicle Info_V 210, select the operation parameters corresponding to the determined target latency by using the mapping table 240*a*, and perform the image processing operation by using the selected operation parameters and the image processing module 200*a*.

However, according to a modifiable embodiment, the memory 200*a* may include a plurality of image processing modules 220*a* rather than one image processing module 220*a*. In this case, the plurality of image processing modules 220a may be designed such that the operation parameters are fixed, unlike the one image processing module 220a. The processor 300a may determine the target latency of the image processing operation based on the information about the host vehicle 210, identify the image processing module 220a corresponding to the determined target latency among the plurality of image processing modules 220a, and perform the image processing operation by using the identified image processing module 220a.

Figure 15:
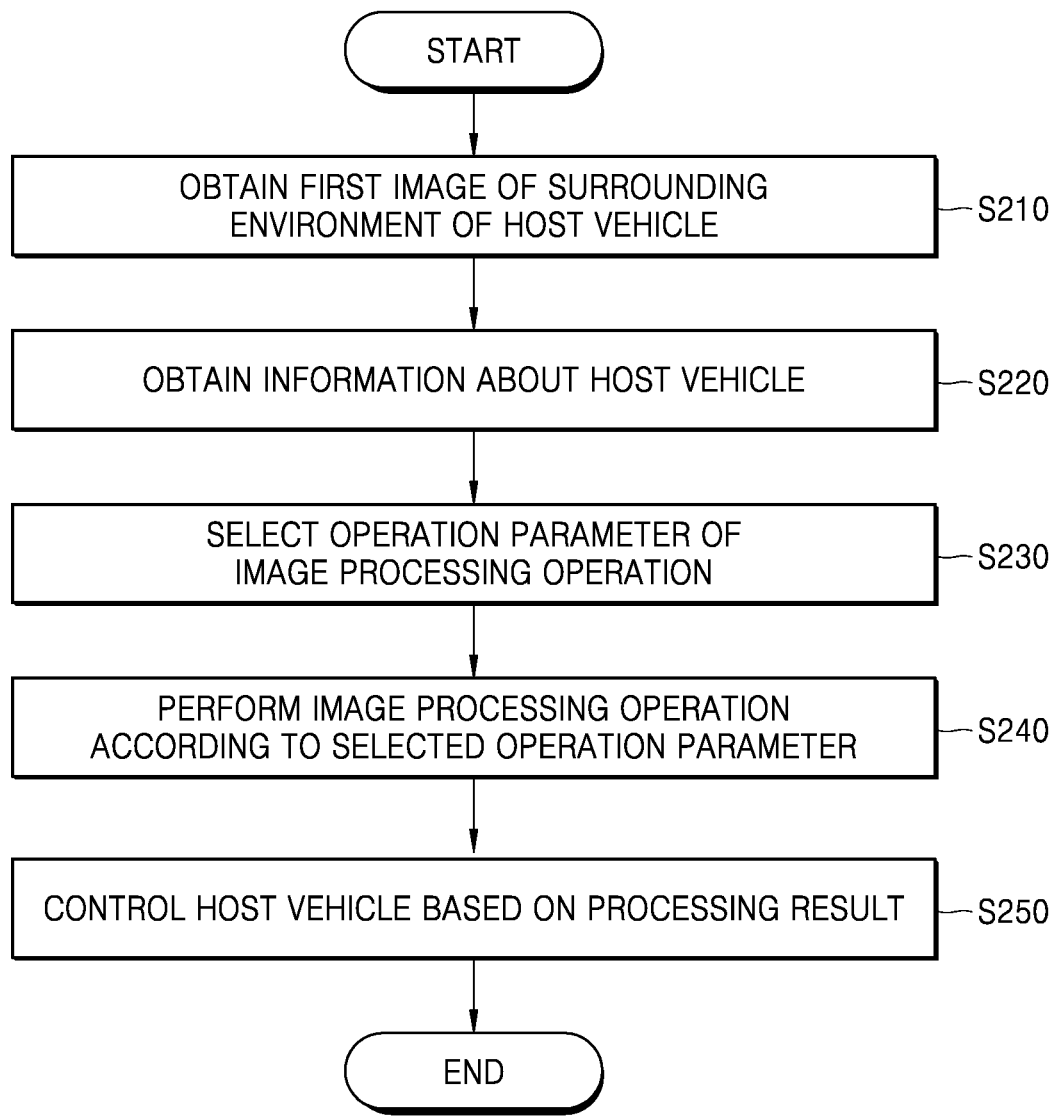
FIG. 15 is a flowchart of an operating method of an electronic device, according to an example embodiment of the inventive concept.

FIG. 15 is a flowchart of an operating method of the electronic device 10a, according to an example embodiment of the inventive concept. FIG. 15 is a flowchart of the operating method of the electronic device 10a of FIG. 14. At least some of operations in FIG. 15 may be performed by the processor 300a of the electronic device 10a of FIG. 14.

First, the electronic device 10a may obtain the first image IMG1 of the surrounding environment of the host vehicle (S210). Then, the electronic device 10a may obtain information about the host vehicle Info_V (S220). The electronic device 10a may obtain the driving information about the host vehicle or the surrounding environment information about the host vehicle. A method, performed by the electronic device 10a, of obtaining the driving information of the host vehicle or the surrounding environment information about the host vehicle may be substantially the same as the method described above with reference to FIG. 1, and redundant descriptions thereof are omitted.

Next, the electronic device 10a may select an operation parameter of the image processing operation (S230). The electronic device 10a may determine the present situation of the host vehicle based on the information on the host vehicle 210, and determine the operation parameters corresponding to the determined present situation. For example, the electronic device 10a may determine whether high speed performance of the present image processing operation is required (or desired) based on the driving information of the host vehicle or the surrounding environment information of the host vehicle, and when the high speed performance is required, may determine the operating parameters corresponding thereto. The operation parameters corresponding to a situation in which the high speed performance is required may be designed to perform the image processing operation with less data throughput than the operation parameters corresponding to a situation in which the high speed performance is not required. For example, when the high speed performance is required, the electronic device 10a may perform the image processing operation more quickly based on less data throughput by reducing the size of the ROI and reducing the number of pyramid images.

Next, the electronic device 10a may perform the image processing operation according to the selected operation parameters (S240). The electronic device 10a may control the image processing module 220a to perform the image processing operation according to the selected operation parameters, and the image processing module 220a may perform the image processing operation according to the control of the electronic device 10a. Next, the electronic device 10a may control the host vehicle based on the processing result (S250).

Figure 16:
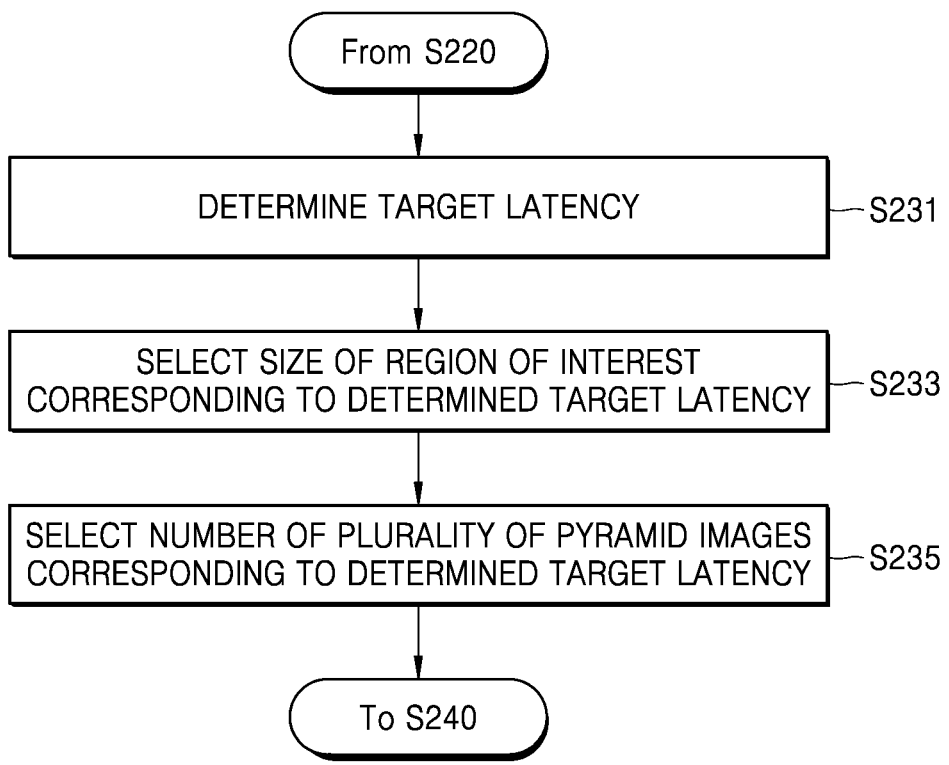
FIG. 16 is a flowchart of a selecting operation of operation parameters, according to an example embodiment of the inventive concept.

FIG. 16 is a flowchart of a selecting operation of the operation parameters, according to an example embodiment of the inventive concept. FIG. 16 is a flowchart illustrating a detailed selecting operation S230 of operation parameters, according to an example embodiment of the inventive concept.

Referring to FIGS. 14 through 16, after obtaining information about the host vehicle Info_V (from S220), the electronic device 10a may determine the target latency (S231). In this case, the target latency may mean a latency corresponding to a reaction speed required to safely control the host vehicle in the present situation of the host vehicle. For example, when the host vehicle is in a dangerous situation requiring the fast response speed (that is, the host vehicle moves at a high speed), the target latency may have a relatively small value. However, when the host vehicle is in a dangerous situation not requiring the fast response speed (that is, the host vehicle moves at a low speed), the target latency may have a relatively large value.

The electronic device 10a may determine the target latency in various ways. In an embodiment, the electronic device 10a may identify the driving speed of the host vehicle, and determine the target latency corresponding to the speed range to which the identified driving speed belongs among the plurality of speed ranges. For example, the electronic device 10a may identify that the speed range to which the driving speed of the host vehicle, or about 100 km/h, corresponds to a high speed range among the high speed range of about 80 km/h or more and the low speed range of less than about 80 km/h, and determine the latency corresponding to the high speed range as the target latency. However, the technical idea of the present disclosure is not limited to an embodiment for determining the target latency among latencies corresponding to two ranges of the high speed region or the low speed region, and according to an embodiment, one of three or more latencies corresponding to one of three or more speed regions may be determined as the target latency.

In another embodiment, when it is identified that a preset event such as a nearby vehicle very close to the host vehicle or the speed of the nearby vehicle suddenly decreasing, based on information about the host vehicle Info_V, the electronic device 10a may determine the latency corresponding to the identified preset event as the target latency. In this case, the memory 200a of the electronic device 10a may store information about the plurality of preset events, and the electronic device 10a may identify the event corresponding to the present state of the host vehicle based on information on the plurality of preset events and information about the host vehicle Info_V. In addition, the electronic device 10a may determine the latency corresponding to the identified preset event among the plurality of latencies as the target latency.

Next, the electronic device 10a may select the size of the ROI corresponding to the determined target latency (S233). The electronic device 10a may select the size of the ROI corresponding to the target latency that has been determined based on the mapping table 240a. Mapping information included in the mapping table 240a may be designed such that the less the target latency, the less the size of the ROI, and the greater the target latency, the greater the size of the ROI.

For example, when the determined target latency is large, the electronic device 10a may select the size of the ROI large enough to include the road in the image and the peripheral region of the road. On the other hand, when the determined target latency is small, the electronic device 10a may select the size of the ROI to include only the road in the image or at least a portion of the road. As another example, the electronic device 10a may identify the size corresponding to the target latency and select the identified size as a size of the ROI, based on information about the size of the preset ROI per latency. In this case, information about the size of the preset ROI per latency may be stored at the time of manufacturing the electronic device 10a or may be received from the outside. However, the method of setting the size of the ROI is not limited to the above-described example, and the size of the ROI may be set in various ways.

Next, the electronic device 10a may select the number of pyramid images corresponding to the determined target latency (S235). The electronic device 10a may select the number of pyramid images corresponding to the target latency that has been determined based on the mapping table 240a. The mapping information included in the mapping table 240a may be designed such that the less the target latency is, the less the number of pyramid images, and the greater the target latency, the greater the number of pyramid images.

For example, the electronic device 10a may identify the number corresponding to the target latency based on information about the number of the preset pyramid images per latency, and select the identified number as the number of pyramid images to be generated later. In this case, information about the number of the preset pyramid images per latency may be stored at the time of manufacturing the electronic device 10a or received from the outside. However, the method of setting the number of pyramid images is not limited to the above-described example, and the number of pyramid images may be set in various ways.

Next, the electronic device 10a may perform the next operation after selecting the number of pyramid images (To S240). The electronic device 10a may extract the ROI having the selected size, generate the selected number of pyramid images, and perform the object recognition operation on the generated pyramid images. In the above-described embodiment, the size of the ROI corresponding to the determined target latency is first selected, and the number of pyramid images is selected later, but the embodiment is not limited thereto. According to various embodiments, the electronic device 10a may select the number of pyramid images first, and select the size of the ROI later, or may simultaneously select both of them in parallel.

Figure 17:
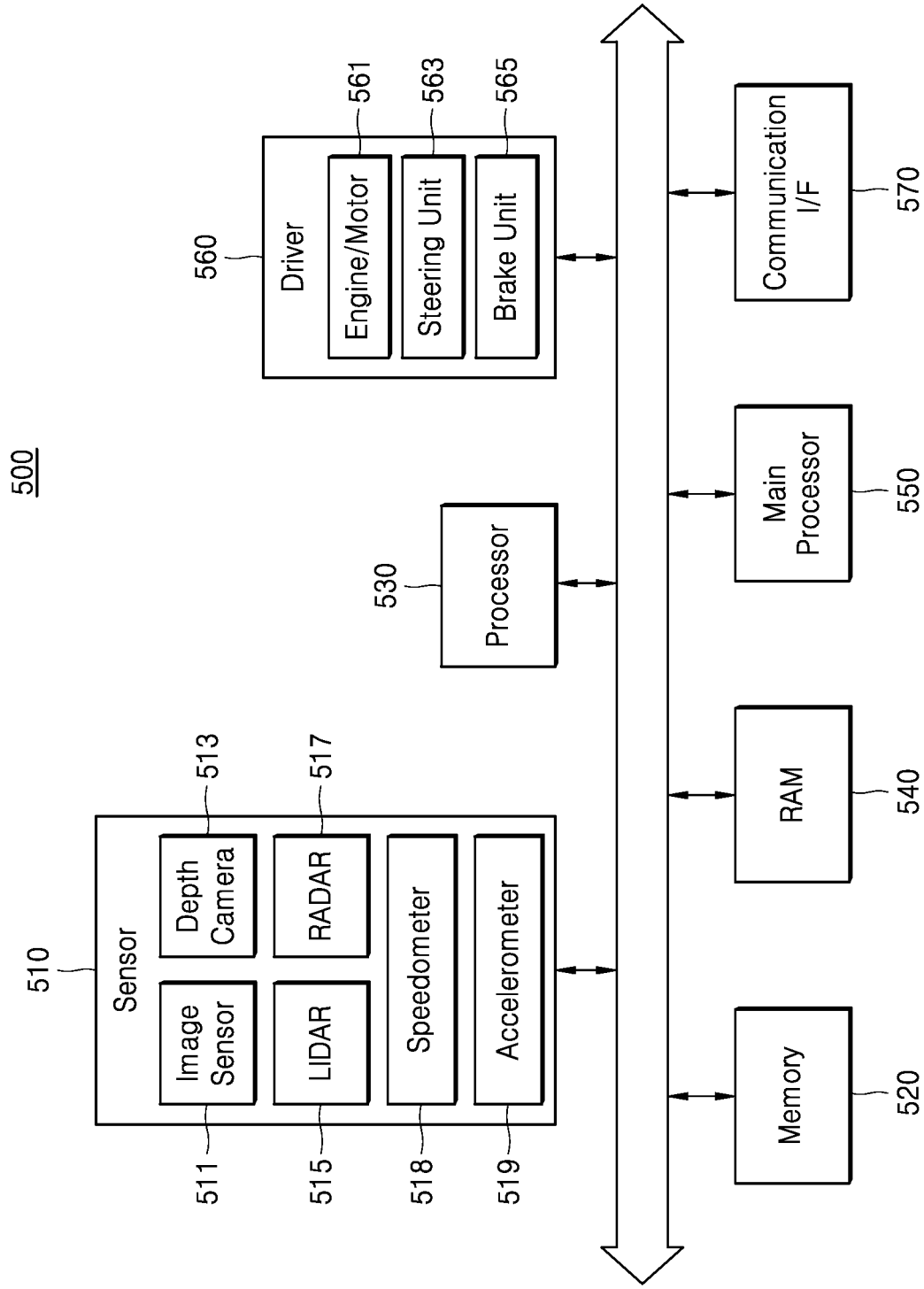
FIG. 17 is a block diagram of an autonomous driving device according to an example embodiment of the inventive concept.

FIG. 17 is a block diagram of an autonomous driving device 500 according to an example embodiment of the inventive concept.

Referring to FIG. 17, the autonomous driving device 500 may include a sensor 510, a memory 520, a processor 530, a RAM 540, a main processor 550, a driver 560, and a communication interface 570. Components of the autonomous driving devices 500 may be communicatively connected to each other via a bus. The image sensor 511 included in the sensor 510 may correspond to the image sensor 100 of the above-described embodiments, and the memory 520 may correspond to the memory 200 of the above-described embodiments, and the processor 530 may correspond to the processor 300 of the above-described embodiments. In addition, the main processor 550 may correspond to the vehicle controller 410 in FIG. 2. In some embodiments, the image sensor 511, the memory 520, and the processor 530 may be implemented by using the embodiments described above with reference to FIGS. 1 through 16.

The autonomous driving device 500 may perform situation determination and vehicle operation control by using a real time analysis of data of the surrounding environment of the autonomous host vehicle based on a neural network.

The sensor 510 may include a plurality of sensors that generate information about the surrounding environment of the autonomous driving device 500. For example, the sensor 510 may include the plurality of sensors that receive image signals regarding the surrounding environment of the autonomous driving device 500 and output the received image signals as images. The sensor 510 may include the image sensor 511, such as a charge coupled device (CCD), a complementary metal oxide semiconductor (CMOS), a depth camera 513, a light detection and ranging (LiDAR) sensor 515, and a radio detecting and ranging (Radar) sensor 517, and the like. In an embodiment, the image sensor 511 may generate a front image of the autonomous driving device 500 and provide it to the processor 530.

In addition, the sensor 510 may include the plurality of sensors that generate driving information about the autonomous driving device 500. For example, the sensor 510 may measure a speedometer 519 measuring the driving speed of the autonomous driving device 500 and outputting the measured driving speed, an accelerometer 520 measuring the driving acceleration of the autonomous driving device 500 and outputting the measured driving acceleration, etc. However, the present disclosure is not limited thereto, and the sensor 510 may include an ultrasonic sensor (not illustrated), an infrared sensor (not illustrated), etc.

The memory 520, as a storage location for storing data, may store, for example, various data generated in operation performance processes of the main processor 550 and the processor 530.

When the processor 530 receives an image from the image sensor 511, the processor 530 may determine whether the high speed performance of the image processing operation is required based on the information about the host vehicle Info_V, and when the high speed performance is required, the processor 530 may control the host vehicle at a fast reaction speed in a dangerous situation by performing the image processing operation by using the image processing module having less data throughput. The method in which the processor 530 extracts the vanishing point VP may be substantially the same as the method described above with reference to FIGS. 1 through 16, and thus duplicate descriptions are omitted.

The main processor 550 may control the overall operation of the autonomous driving device 500. For example, the main processor 550 may control functions of the processor 530 by executing programs stored in the RAM 540. The RAM 540 may temporarily store programs, data, applications, or instructions.

In addition, the main processor 550 may control the operation of the autonomous driving device 500 based on the calculation result of the processor 530. In an embodiment, the main processor 550 may receive information about the vanishing point VP from the processor 530, and control the operation of the driving unit 560 based on the received information about the vanishing point VP.

The driving unit 560, configured to drive the autonomous driving device 500, may include an engine and motor 561, a steering unit 563, and a brake unit 565. In an embodiment, the driving unit 560 may adjust thrust, brake, speed, direction, and the like of the autonomous driving device 500 by using the engine and motor 561, the steering unit 563, and the brake unit 565 under the control of the processor 530.

The communication interface 570 may communicate with an external device by using a wired or wireless communication method. For example, the communication interface 570 may communicate by using a wired communication method such as Ethernet, or by using a wireless communication method such as Wi-Fi and Bluetooth.

While the inventive concept has been particularly shown and described with reference to embodiments thereof, it will be understood that various changes in form and details may be made therein without departing from the spirit and scope of the following claims.

What is claimed is:

1. An electronic device configured to control a host vehicle, the electronic device comprising:
 an image sensor configured to photograph a surrounding environment of the host vehicle; and
 a processor configured to perform an image processing operation based on a first image captured by the image sensor, and control the host vehicle based on the processing result,
 wherein the processor determines whether to use a high speed performance of the image processing operation based on a speed of the host vehicle, and the electronic device is configured such that:
 when the high speed performance is not used, the processor performs the image processing operation by using a first image processing module, and
 when the high speed performance is used, the processor performs the image processing operation by using a second image processing module having less data throughput than the first image processing module.

2. The device of claim 1, wherein the processor determines to use the high speed performance when the speed of the host vehicle is greater than or equal to a first threshold speed, and
 the processor determines to not use the high speed performance when the speed of the host vehicle is less than the first threshold speed.

3. The device of claim 1, wherein the first image processing module and the second image processing module are each configured to extract a region of interest (ROI) from the first image, generate a plurality of pyramid images having different scales from each other based on the extracted ROI, and perform an object detection operation on the generated plurality of pyramid images.

4. The device of claim 3, wherein the second image processing module image is configured to extract, from the first image, an ROI having a smaller size than the ROI extracted by the first image processing module.

5. The device of claim 4, wherein the second image processing module is configured to determine a road region of the first image based on vanishing point information, and extracts the determined road region as the ROI.

6. The device of claim 3, wherein the first image processing module is configured to generate M (M is a positive integer) pyramid images, and
 the second image processing module is configured to generate Y (Y is a positive integer less than M) pyramid images.

7. The device of claim 1, wherein the processor is configured to determine whether the high speed performance is required by additionally considering information about the surrounding environment of the host vehicle.

8. The device of claim 7, wherein the processor is configured to determine whether to use the high speed performance of the image processing operation based on the information about the surrounding environment of the host vehicle when the speed of the host vehicle is less than a first threshold speed.

9. The device of claim 7, wherein the information about the surrounding environment of the host vehicle comprises at least one of information about speed, acceleration, a moving distance, and a location of an object located near the host vehicle and information about a normal speed or a speed limit of a road on which the host vehicle moves.

10. The device of claim 9, wherein the processor is configured to estimate a collision risk between the host vehicle and the object based on at least one of the speed, the acceleration, the moving distance, and the location of the object located near the host vehicle, and when the collision risk is estimated, determine that the high speed performance of the image processing operation is required.

11. The device of claim 9, wherein the processor is configured to determine to use the high speed performance of the image processing operation when the normal speed or the speed limit of the road on which the host vehicle moves is greater than or equal to a second threshold speed.

12. The device of claim 1, wherein the processor is configured to perform the image processing operation on a preset number of continuous images captured by the image sensor by using the second image processing module, when the high speed performance is required, and
 the continuous images comprise the first image.

13. The device of claim 1, wherein the processor is configured to perform the image processing operation by alternately applying the second image processing module and the first image processing module on a preset number of continuous images captured by the image sensor, when the high speed performance is used.

14. An electronic device configured to control a host vehicle, the electronic device comprising:
 an image sensor configured to photograph a surrounding environment of the host vehicle; and
 a processor configured to perform an image processing operation based on a first image captured by the image sensor, and control the host vehicle based on the processing result,
 wherein the processor is configured to select an operation parameter of an image processing operation based on driving information about the host vehicle or information about the surrounding environment of the host vehicle, and perform the image processing operation according to the selected operation parameter,
 wherein the processor is configured to determine a target latency of the image processing operation based on the driving information about the host vehicle or the information about the surrounding environment of the host vehicle, and select the operation parameter according to the determined target latency.

15. The device of claim 14, wherein the operation parameter has a size of a region of interest (ROI),
 wherein the processor is configured to select the size of the ROI corresponding to the determined target latency.

16. The device of claim 15, wherein the operation parameter comprises a number of a plurality of pyramid images comprising different scales from each other,
 wherein the processor is configured to select the number of pyramid images corresponding to the determined target latency.

17. The device of claim 16, wherein the processor is configured to extract the ROI having the selected size from the first image, generate the selected number of pyramid images based on the extracted ROI, and perform an object detection operation on the generated pyramid images.

18. The device of claim 14, further comprising a memory storing a plurality of image processing modules corresponding to a plurality of target latencies,
 wherein the processor is configured to select an image processing module corresponding to the target latency among the plurality of image processing modules, and perform the image processing operation by using the selected image processing module.

19. An operating method of an electronic device configured to control a host vehicle, the method comprising:
- obtaining a first image of a surrounding environment of the host vehicle;
- obtaining speed information about the host vehicle;
- identifying whether a speed of the host vehicle is greater than or equal to a threshold speed;
- when the speed of the host vehicle is less than the threshold speed, processing the first image by using a first image processing method;
- when the speed of the host vehicle is greater than or equal to the threshold speed, processing the first image by using a second image processing method having less data throughput than the first image processing method; and
- controlling the host vehicle based on the processing result of the first image.

20. The operating method of claim 19, further comprising:
- determining whether to use the first image processing method or the second image processing method by additionally considering information about the surrounding environment of the host vehicle.

* * * * *